(12) United States Patent
Hassan et al.

(10) Patent No.: US 7,295,928 B2
(45) Date of Patent: Nov. 13, 2007

(54) ENHANCING THE QUALITY AND RESOLUTION OF AN IMAGE GENERATED FROM SINGLE OR MULTIPLE SOURCES

(75) Inventors: Gamal Hassan, Houston, TX (US); Andrew Kirkwood, Houston, TX (US); Phil Kurkoski, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 42 days.

(21) Appl. No.: 11/256,431

(22) Filed: Oct. 21, 2005

(65) Prior Publication Data

US 2006/0106541 A1   May 18, 2006

Related U.S. Application Data

(60) Provisional application No. 60/620,903, filed on Oct. 21, 2004.

(51) Int. Cl.
*G01V 3/38* (2006.01)
(52) U.S. Cl. ............................................. 702/9; 702/7
(58) Field of Classification Search ............... 702/9, 702/7
See application file for complete search history.

(56) References Cited

U.S. PATENT DOCUMENTS

| | | | |
|---|---|---|---|
| 3,202,822 A | 8/1965 | Kehler | 250/83.3 |
| 3,321,625 A | 5/1967 | Wahl | 250/71.5 |
| 3,846,631 A | 11/1974 | Kehler | 250/269 |
| 3,858,037 A | 12/1974 | Moore et al. | 235/193 |
| 3,864,569 A | 2/1975 | Tittman | 250/264 |
| 4,628,202 A | 12/1986 | Minette | 250/269 |
| 4,745,562 A | 5/1988 | Prazdny | 364/551 |
| 5,019,708 A | 5/1991 | Flaum | 250/264 |
| 5,191,548 A | 3/1993 | Balkanski et al. | 364/725 |
| 5,301,205 A | 4/1994 | Tsutsui et al. | 371/1 |
| 5,388,209 A | 2/1995 | Akagiri | 395/2.38 |

(Continued)

FOREIGN PATENT DOCUMENTS

WO   WO03079051   9/2003

OTHER PUBLICATIONS

Zhang et al.; *Physical wavelet frame denoising*, XP-002371024, Geophysics, vol. 68, No. 1, Jan.-Feb. 2003, pp. 225-231, 6 Figs.
Bernasconi et al.; *High-quality compression of MWD signals*, XP-002371025, Geophysics, vol. 69, No. 3, May-Jun. 2004, pp. 849-858, 14 Figs.

*Primary Examiner*—Donald E McElheny, Jr.
(74) *Attorney, Agent, or Firm*—Madan, Mossman & Sriram, P.C.

(57) ABSTRACT

The present invention provides a method and apparatus for logging an earth formation and acquiring subsurface information wherein a logging tool is conveyed in a borehole to obtain parameters of interest. The parameters of interest obtained may be density, acoustic, magnetic or electrical values as known in the art. As necessary, azimuths associated with the measurements are obtained and corrections applied. The corrected data may be filtered and/or smoothed. The parameters of interest associated with azimuthal sectors are depth matched, resolution matched and filtered, and the acquisition effects removed. The data are denoised using a multi-resolution wavelet transform. The data acquired with separate transducers are resolution matched to obtain a resolution matched data series. Subsequently the resolution matched data may be further denoised using a multi-resolution wavelet transform.

20 Claims, 29 Drawing Sheets

U.S. PATENT DOCUMENTS

| | | | |
|---|---|---|---|
| 5,397,893 A | 3/1995 | Minette | 250/254 |
| 5,453,844 A | 9/1995 | George et al. | 358/426 |
| 5,513,528 A | 5/1996 | Holenka et al. | 73/151 |
| 5,610,657 A | 3/1997 | Zhang | 348/415 |
| 5,684,693 A | 11/1997 | Li | 364/422 |
| 5,757,852 A | 5/1998 | Jericevic et al. | 375/240 |
| 6,049,632 A | 4/2000 | Cockshott et al. | 382/239 |
| 6,209,640 B1 | 4/2001 | Reimers et al. | 166/254.1 |
| 6,253,848 B1 | 7/2001 | Reimers et al. | 364/551 |
| 6,307,199 B1 | 10/2001 | Edwards et al. | 250/269.3 |
| 6,405,136 B1 | 6/2002 | Li et al. | 702/10 |
| 6,584,837 B2 | 7/2003 | Kurkoski | 73/152.02 |
| 6,748,329 B2 * | 6/2004 | Mandal | 702/14 |
| 6,807,486 B2 | 10/2004 | Tobias et al. | 702/9 |
| 6,865,486 B2 | 3/2005 | Tobias et al. | 702/9 |
| 2002/0183931 A1 | 12/2002 | Anno | 702/14 |
| 2002/0195276 A1 | 12/2002 | Dubinsky et al. | 175/40 |

\* cited by examiner

| Time | D1 | D2 | D3 | Dn |
|------|------|------|------|------|
| T1 | r(1,1) | r(1,2) | r(1,3) | r(1,n) |
| T2 | r(2,1) | r(2,2) | r(2,3) | r(2,n) |
| T3 | r(3,1) | r(3,2) | r(3,3) | r(3,n) |
| T4 | r(4,1) | r(4,2) | r(4,3) | r(4,n) |
| T5 | r(5,1) | r(5,2) | r(5,3) | r(5,n) |

*FIGURE 6*

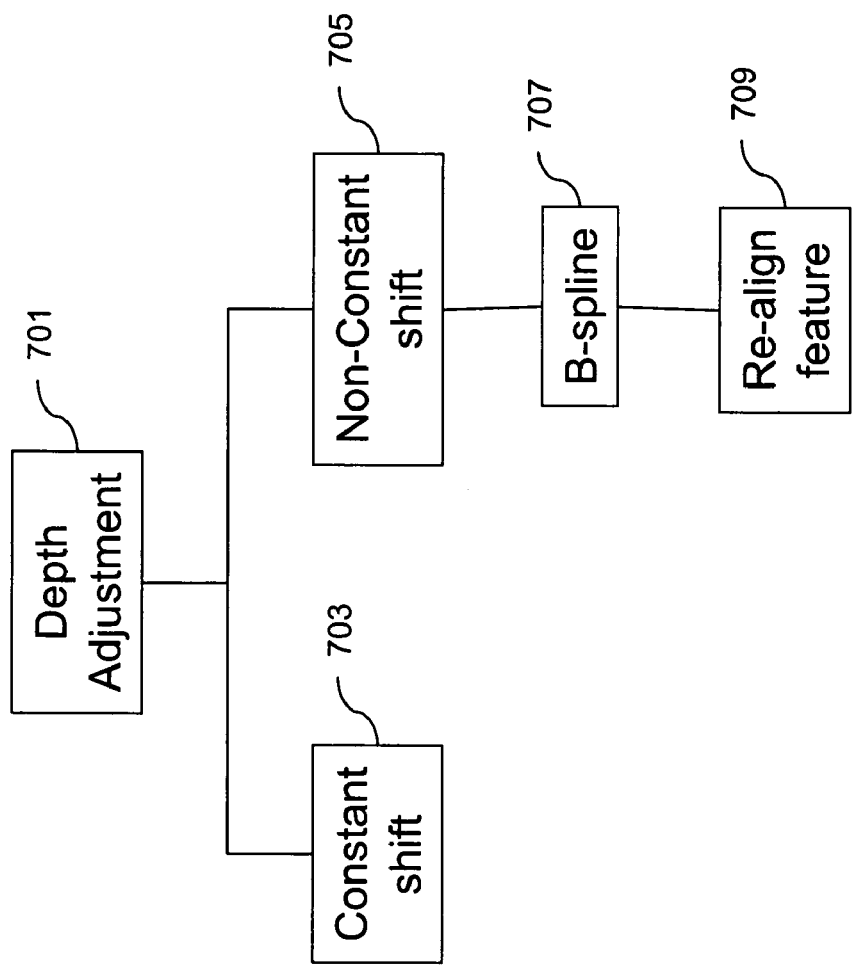

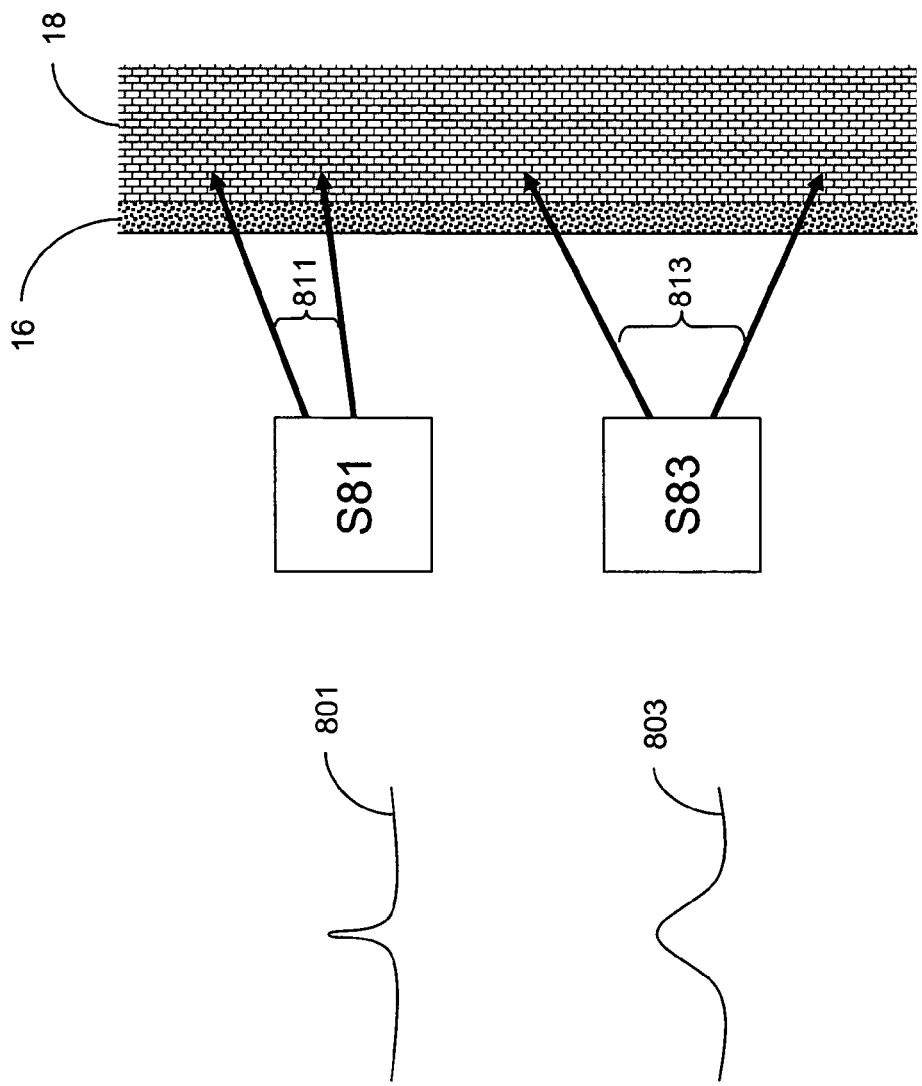

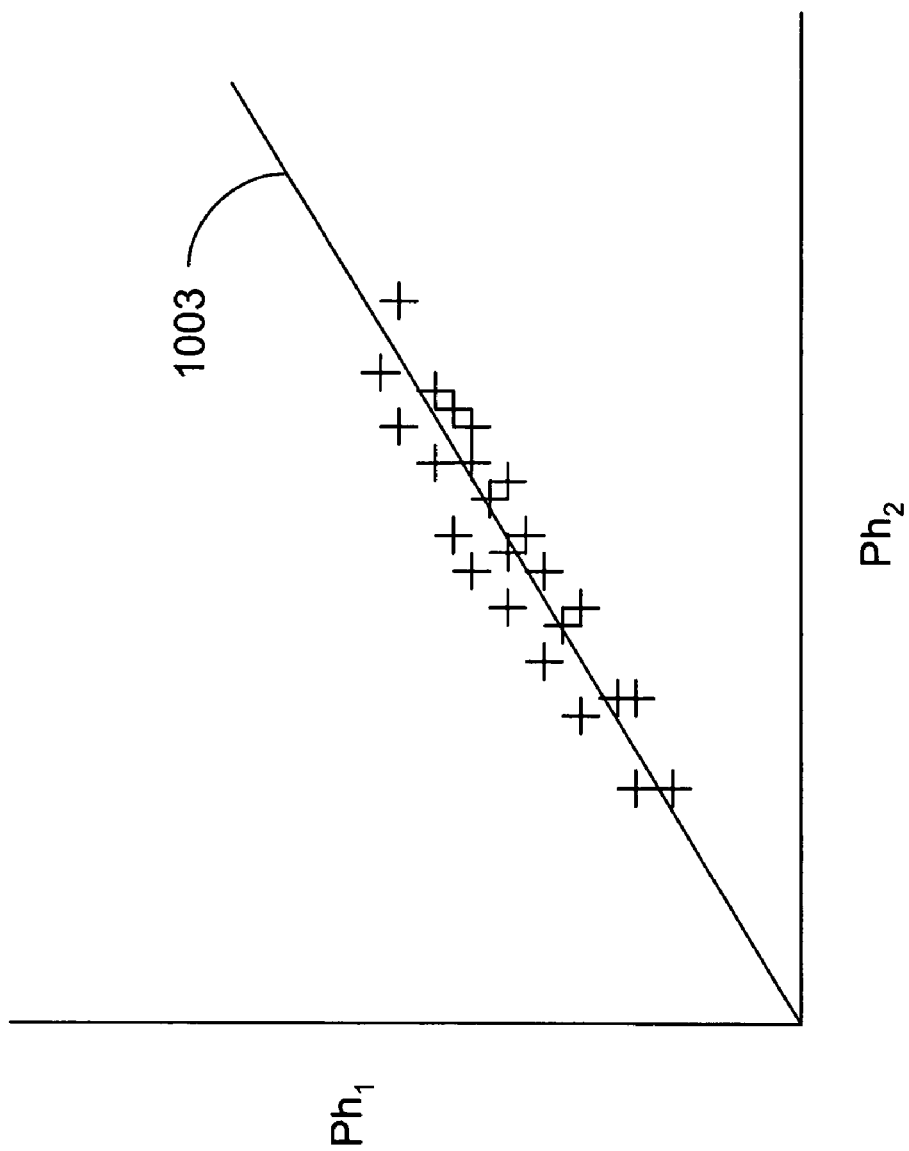

| Time | Depth | TVD | Sector Data 1-n | | | | | | |
|------|-------|-----|---|---|---|---|---|---|---|
| T1 | D1 | Tv1 | 3 | 9 | 6 | 2 | 8 | 1 | 1 |
| T2 | D2 | Tv2 | 9 | 8 | 6 | 1 | 4 | 6 | 2 3 |
| T3 | D3 | Tv3 | 1 | 4 | 9 | 4 | 3 | 2 | 3 0 |
| T4 | D4 | Tv4 | 3 | 2 | 4 | 1 | 9 | 7 | 1 2 |
| T5 | D5 | Tv5 | 0 | 0 | 6 | 4 | 3 | 3 | 1 1 |
| T6 | D6 | Tv6 | 7 | 7 | 3 | 4 | 2 | 8 | 2 3 |

*FIGURE 17*

ENHANCING THE QUALITY AND RESOLUTION OF AN IMAGE GENERATED FROM SINGLE OR MULTIPLE SOURCES

CROSS REFERENCES TO RELATED APPLICATIONS

This application claims priority from U.S. Provisional Patent Application No. 60/620,903 filed on Oct. 21, 2004.

FIELD OF THE INVENTION

1. Field of the Invention

This invention relates generally methods processing logging-while-drilling (LWD) measurements. More particularly, this invention relates to enhancing borehole images from logging data by removing acquisition artifacts.

2. Background of the Art

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

A wireline sonde usually transmits energy into the formation as well as a suitable receiver for detecting the same energy returning from the formation to provide acquisition of a parameter of interest. As is well known in this art, these parameters of interest include electrical resistivity, acoustic energy, or nuclear measurements which directly or indirectly give information on subsurface densities, reflectances, boundaries, fluids and lithologies among many others.

Examples of prior art wireline density devices are disclosed in U.S. Pat. Nos. 3,202,822, 3,321,625, 3,846,631, 3,858,037, 3,864,569 and 4,628,202. Wireline formation evaluation tools (such as gamma ray density tools) have many drawbacks and disadvantages including loss of drilling time, the expense and delay involved in tripping the drillstring so as to enable the wireline to be lowered into the borehole and both the build up of a substantial mud cake and invasion of the formation by the drilling fluids during the time period between drilling and taking measurements. An improvement over these prior art techniques is the art of measurement-while-drilling (MWD) in which many of the characteristics of the formation are determined substantially contemporaneously with the drilling of the borehole.

LWD, also known as measurement-while-drilling (MWD), logging either partly or totally eliminates the necessity of interrupting the drilling operation to remove the drill string from the hole in order to make the necessary measurements obtainable by wireline techniques. In addition to the ability to log the characteristics of the formation through which the drill bit is passing, this information on a real time basis provides substantial safety and logistical advantages for the drilling operation.

One potential problem with MWD logging tools is that the measurements are typically made while the tool is rotating. Since the measurements are made shortly after the drill bit has drilled the borehole, washouts are less of a problem than in wireline logging. Nevertheless, there can be some variations in the spacing between the logging tool and the borehole wall ("standoff") with azimuth. Nuclear measurements are particularly degraded by large standoffs due to the scattering produced by borehole fluids between the tool and the formation.

U.S. Pat. No. 5,019,708 to Flaum teaches a method for eliminating the effect of rugosity from compensated formation logs by geometrical response matching. A method for determining the compensated density of a subsurface geological formation wherein the effect of borehole rugosity is reduced or eliminated utilizes the differences in the vertical response functions of the detectors at different distances into the formation. The method eliminates the contribution of the "shallow" formation region, irrespective of whether its properties are varying slowly or rapidly, without degrading the resulting vertical resolution. Furthermore, the method for determining such a characteristic of a subsurface geological formation does not require any additional or new measurements to be made, thus logging data from older wells can easily be reevaluated.

U.S. Pat. No. 5,397,893 to Minette, the contents of which are fully incorporated herein by reference, teaches a method for analyzing data from a MWD formation evaluation logging tool which compensates for rotation of the logging tool (along with the rest of the drillstring) during measurement periods. The density measurement is combined with the measurement from a borehole caliper, preferably an acoustic caliper. The acoustic caliper continuously measures the standoff as the tool is rotating around the borehole. If the caliper is aligned with the density source and detectors, this gives a determination of the standoff in front of the detectors at any given time. This information is used to separate the density data into a number of bins based on the amount of standoff. After a pre-set time interval, the density measurement can then be made. The first step in this process is for short space (SS) and long space (LS) densities to be calculated from the data in each bin. Then, these density measurements are combined in a manner that minimizes the total error in the density calculation. This correction is applied using the "spine and ribs" algorithm and graphs such as that shown in FIG. 1A. In the figure, the abscissa 1 is the difference between the LS and SS densities while the ordinate 3 is the correction that is applied to the LS density to give a corrected density using the curve 5.

U.S. Pat. No. 5,513,528 to Holenka et al, incorporated herein by reference, teaches a method and apparatus for measuring formation characteristics as a function of azimuth about the borehole. The measurement apparatus includes a logging while drilling tool which turns in the borehole while drilling. The down vector of the tool is derived first by determining an angle $\phi$ between a vector to the earth's north magnetic pole, as referenced to the cross sectional plane of a measuring while drilling (MWD) tool and a gravity down vector as referenced in the plane. The logging while drilling (LWD) tool includes magnetometers and accelerometers placed orthogonally in a cross-sectional plane. Using the magnetometers and/or accelerometer measurements, the toolface angle can usually be determined. The angle $\phi$ is transmitted to the LWD tool thereby allowing a continuous determination of the gravity down position in the LWD tool. Quadrants, that is, angular distance segments, are measured from the down vector. Referring to Holenka et al's FIG. 1B illustrating a LWD tool 100 rotating in an inclined borehole 12, an assumption is made that the down vector defines a situation in which the standoff is at a minimum, allowing for a good spine and rib correction. A drawback of the Holenka et al method is that the assumption of minimum standoff is not necessarily satisfied, so that the down position may in fact correspond to a significant standoff; without a standoff correction the results may be erroneous.

In a centralized or stabilized tool, the standoff will generally be uniform with azimuth. Holenka (U.S. Pat. No. 5,513,528) and Edwards (U.S. Pat. No. 6,307,199) also show how azimuthal measurements of density may be diagnostic of bed boundaries intersected by an inclined borehole. In the absence of standoff corrections, this can only be a qualitative measurement.

U.S. Pat. No. 6,584,837 to Kurkoski, fully incorporated by reference herein, discloses a LWD density sensor that includes a gamma ray source and at least two NaI detectors spaced apart from the source for determining measurements indicative of the formation density. A magnetometer on the drill collar measures the relative azimuth of the NaI detectors. An acoustic caliper is used for making standoff measurements of the NaI detectors. Measurements made by the detectors are partitioned into spatial bins defined by standoff and azimuth. Within each azimuthal sector, the density measurements are compensated for standoff to provide a single density measurement for the sector. The azimuthal sectors are combined in such a way as to provide a compensated azimuthal geosteering density. The method of the invention may also be used with neutron porosity logging devices.

MWD instruments, in some cases, include a provision for sending at least some of the subsurface images and measurements acquired to recording equipment at the earth's surface at the time the measurements are made using a telemetry system (i.e. MWD telemetry). One such telemetry system modulates the pressure of a drilling fluid pumped through the drilling assembly to drill the wellbore. The fluid pressure modulation telemetry systems known in the art, however, are limited to transmitting data at a rate of at most only a few bits per second. Because the volume of data measured by the typical image-generating well logging instrument is relatively large, at present, borehole images are generally available only using electrical cable-conveyed instruments, or after an MWD instrument is removed from the wellbore and the contents of an internal storage device, or memory, are retrieved.

Many types of well logging instruments have been adapted to make measurements which can be converted into a visual representation or "image" of the wall of a wellbore drilled through earth formations. Typical instruments for developing images of parameters of interest measurements include density measuring devices, electrical resistivity measuring devices and acoustic reflectance/travel time measuring devices. These instruments measure a property of the earth formations proximate to the wall of the wellbore, or a related property, with respect to azimuthal direction, about a substantial portion of the circumference of the wellbore. The values of the property measured are correlated to both their depth position in the wellbore and to their azimuthal position with respect to some selected reference, such as geographic north or the gravitationally uppermost side of the wellbore. A visual representation is then developed by presenting the values, with respect to their depths and azimuthal orientations, for instance, using a color or gray tone which corresponds to the value of the measured property.

One method known in the art for transmitting image-generating measurements in pressure modulation telemetry is described, for example, in U.S. Pat. No. 5,519,668 issued to Montaron. This method includes making resistivity measurements at preselected azimuthal orientations, and transmitting the acquired resistivity values to the surface through the pressure modulation telemetry. The method described in the Montaron '668 patent requires synchronization of the resistivity measurements to known rotary orientations of the MWD instrument to be able to decode the image data at the surface without transmitting the corresponding rotary orientations at which the measurements were made.

U.S. Pat. No. 6,405,136 to Li, et al fully incorporated by reference herein, discloses a method for compressing a frame of data representing parameter values, a time at which each parameter value was recorded, and an orientation of a sensor at the time each parameter value was recorded. Generally the method includes performing a two-dimensional transform on the data in the orientation domain and in a domain related to the recording time. In one embodiment, the method includes calculating a logarithm of each parameter value. In one embodiment, the 2-D transform includes generating a Fourier transform of the logarithm of the parameter values in the azimuthal domain, generating a discrete cosine transform of the transform coefficients in the time domain. This embodiment includes quantizing the coefficients of the Fourier transform and the discrete cosine transform. One embodiment of the method is adapted to transmit resistivity measurements made by an LWD instrument in pressure modulation telemetry so that while-drilling images of a wellbore can be generated. The one embodiment includes encoding the quantized coefficients, error encoding the encoded coefficients, and applying the error encoded coefficients to the pressure modulation telemetry.

Other data compression techniques, for various applications, are described in several other U.S. patents, for example, U.S. Pat. No. 5,757,852 to Jericevic et al; U.S. Pat. No. 5,684,693 to Li; U.S. Pat. No. 5,191,548 to Balkanski et al; U.S. Pat. No. 5,301,205 to Tsutsui et al; U.S. Pat. No. 5,388,209 to Akagiri; U.S. Pat. No. 5,453,844 to George et al; U.S. Pat. No. 5,610,657 to Zhang; and U.S. Pat. No. 6,049,632 to Cockshott et al. Many prior art data compression techniques are not easily or efficiently applicable to the extremely low bandwidth and very high noise level of the communication methods of the typical MWD pressure modulation telemetry system, and, have not been suitable for image transmission by such telemetry.

U.S. application Ser. No. 10/167,332 (Publication 20020195276 A1) to Dubinsky et al, entitled "Use of Axial Accelerometer for Estimation of Instantaneous ROP Downhole for LWD and Wireline Applications" the contents of which are incorporated herein by reference, disclose that determination of the rate of penetration (ROP) of drilling has usually been based upon surface measurements and may not be an accurate representation of the actual ROP. This can cause problems in Logging While Drilling (LWD). Because of the lack of a high-speed surface-to-downhole communication while drilling, a conventional method of measuring ROP at the surface does not provide a solution to this problem. However, the instantaneous ROP can be derived downhole with a certain degree of accuracy by utilizing an accelerometer placed in (or near) the tool to measure acceleration in the axial direction. When three-component accelerometers are used, the method may be used to determine the true vertical depth of the borehole.

There is a need for a method to enhance borehole images data by removing acquisition artifacts and enhancing the quality and resolution of an image generated from single or multiple sources. The present invention satisfies this need. It is desirable to have a system which enables transmission of data for imaging a wellbore through pressure modulation or other telemetry so that images of a wellbore can be developed during the drilling of a wellbore, wherein the rotary orientation of each image-developing measurement is included in the transmitted data. It is also desirable to efficiently and timely determine estimates of positions and orientations of boundaries between layers of earth formations.

SUMMARY OF THE INVENTION

The present invention provides a method and apparatus for logging an earth formation and acquiring subsurface information wherein a logging tool is conveyed in a borehole to obtain parameters of interest. The parameters of interest obtained may be density, acoustic, magnetic or electrical values as known in the art. As necessary, azimuths associated with the measurements are obtained and corrections applied. The corrected data may be filtered and/or smoothed. The parameters of interest associated with azimuthal sectors are depth matched, resolution matched and filtered, and the acquisition effects removed. The data are denoised using a multi-resolution wavelet transform. The data acquired with separate transducers are resolution matched to obtain a resolution matched data series. Subsequently the resolution matched data may be further denoised using a multi-resolution wavelet transform.

BRIEF DESCRIPTION OF THE FIGURES

The present invention and its advantages will be better understood by referring to the following detailed description and the attached drawings in which:

FIG. 6 illustrates a table of time versus depth that may be developed a priori or as data are collected;

FIG. 7 is a flow chart of depth adjustment;

FIG. 8 illustrates an example of the resolution difference between data series signals that are effectively averaged over an aperture range associated with the source;

FIG. 10 illustrates a cross-plot of signal phases as used to test for linearity;

FIG. 17 illustrates a data collection display;

Figure 1A:
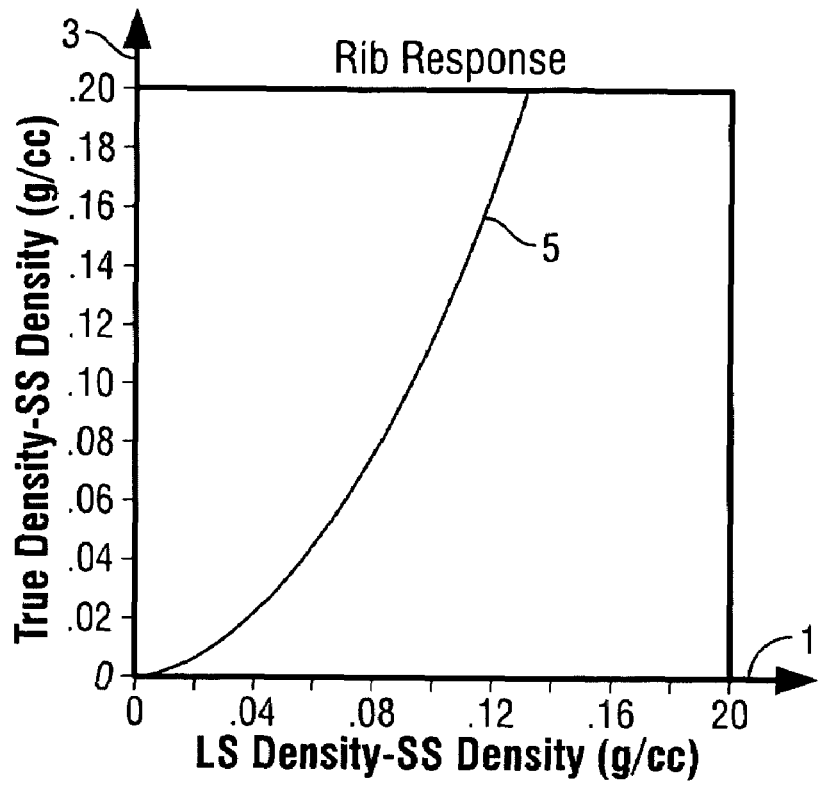
FIG. 1A (PRIOR ART) shows an example of how density measurements made from a long spaced and a short spaced tool are combined to give a corrected density.
Figure 1B:
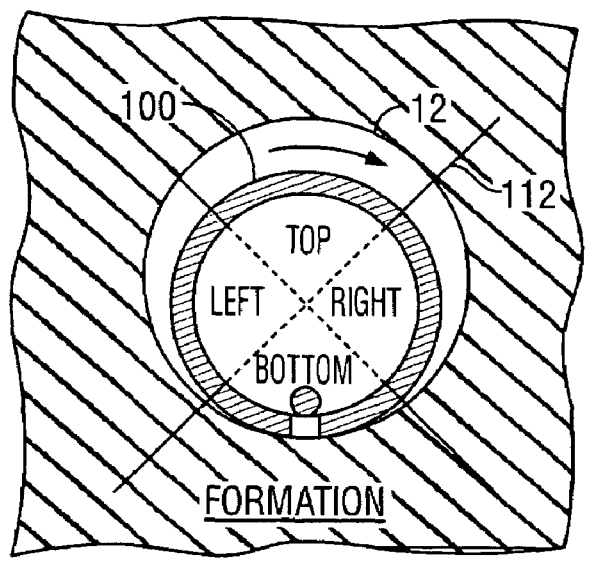
FIG. 1B (PRIOR ART) shows an idealized situation in which a rotating tool in a wellbore has a minimum standoff when the tool is at the bottom of the wellbore.

While the invention will be described in connection with its preferred embodiments, it will be understood that the invention is not limited thereto. It is intended to cover all alternatives, modifications, and equivalents which may be included within the spirit and scope of the invention, as defined by the appended claims.

DETAILED DESCRIPTION OF THE INVENTION

Wireline logging tools have been used successfully to produce subsurface images. Due to data bandwidth limitations related to conventional telemetry, for MWD or LWD applications, density tool measurements and other measurements have been stored in the MWD tool's memory. Therefore subsurface images and parameter determinations haven't been generally available for real time applications such as geosteering.

An LWD measurement data set can be used to create an image if the sensors are rotated during data acquisition, and the response (data) plotted versus well depth and azimuthal position around the bore. The result will be an image representation of the formation parameters particular to the sensors used.

Processing techniques are applied to individual sensor responses, or the combined response function of a sensor array. These processing techniques when applied to the image improve the accuracy, enhance features, and remove false structure. Some examples of image artifacts that are addressed by this technique:—Spiral drilling can hide structural features. Sensor DOI (depth of investigation) distorts bed inclination and bed azimuth determination. Differences in individual sensor resolutions (when two or more sensors are used) can hide or distort features. Fractures can be hidden by signal resolution limitations (vertical and azimuthal). Image quality can be distorted due to the lack of accuracy in azimuthal measurements. Image can be distorted due to the non accuracy of the azimuth measurements. Image can be distorted due to the non accuracy of measuring the standoff. The processing technique applied to the response of a sensor (or group of sensors) uses a combination of resolution matching, depth matching, and characteristic response matching, and filtering techniques to remove the above effects on the log accuracy. In addition to processing techniques certain mechanical and sensor design parameters can be implemented to enhance the initial quality of an image and work in conjunction with the processing techniques to further enhance the overall performance of the imaging product. For example, azimuthally focusing the detectors of a gamma density tool enhances the image quality without degrading the primary function of measuring density.

The present invention which provides for acquiring parameters of interest is discussed with reference to a density measurement tool that emits nuclear energy, and more particularly gamma rays, but the method of the present invention is applicable to other types of logging instruments as well (e.g., acoustic methods, magnetic resonance and electrical methods). Wireline gamma ray density probes are well known and comprise devices incorporating a gamma ray source and a gamma ray detector, with source and/or detector appropriately shielded to prevent counting of radiation emitted directly from the source. During operation of the probe, gamma rays (or photons) emitted from the source enter the formation to be studied, and interact with the atomic electrons of the material of the formation by photoelectric absorption, by Compton scattering, or by pair production. In photoelectric absorption and pair production phenomena, the particular photons involved in the interacting are removed from the gamma ray beam. Instruments for making measurements of acoustic properties and gamma-gamma density have several advantages known in the art, and it should be understood that the instruments disclosed are not the only instruments that can be used to make such measurements. Accordingly, the invention is not to be limited to measurements of parameters of interest made by the particular instruments described herein.

The present invention provides a method and apparatus for logging while drilling an earth formation and acquiring subsurface information wherein a logging tool is conveyed in borehole to obtain parameters of interest. The parameters of interest obtained may be density, acoustic, magnetic or electrical values as known in the art. As necessary, a standoff and azimuth associated with the measurements are obtained and corrections applied. The corrected data may be filtered and/or smoothed.

Figure 1C:
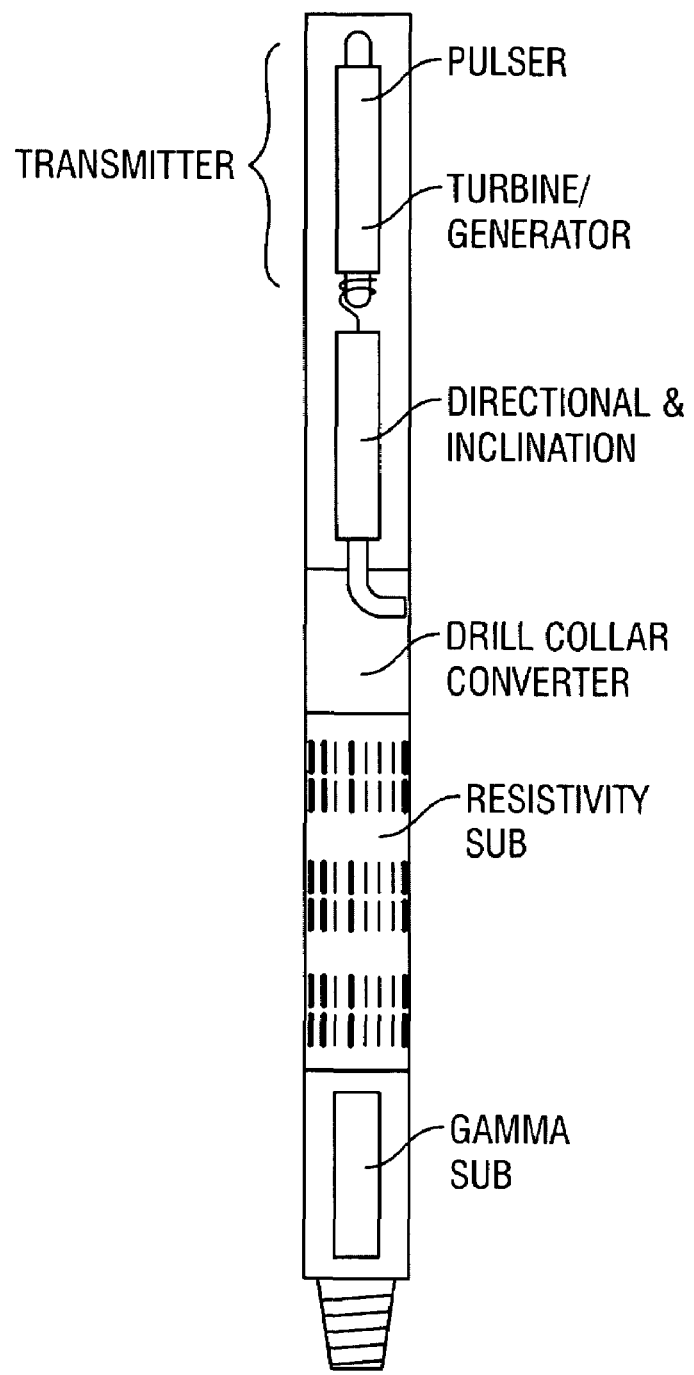
FIG. 1C (PRIOR ART) shows an example a resistivity logging tool.

FIG. 1C illustrates an example of a resistivity logging tool. The exemplary tool includes a pulser and turbine/generator that make up a transmitter. Also included are apparatus for directional and inclination information, a drill collar converter, resistivity sub and gamma sub. Other tools and tool combination are well known in the art.

Figure 1D:
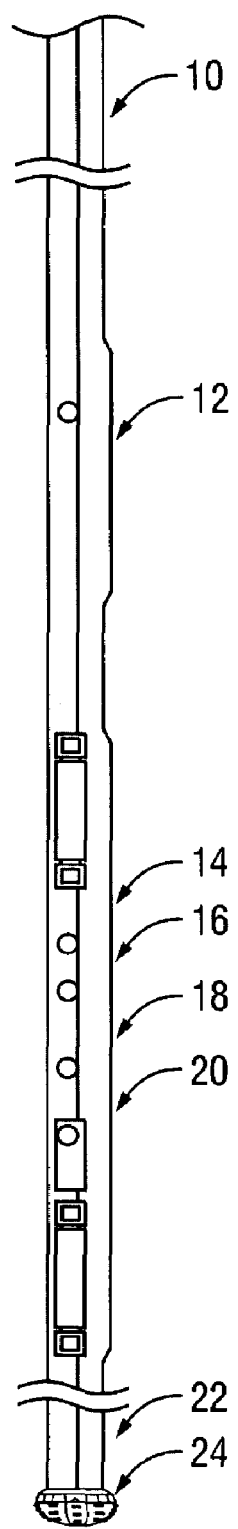
FIG. 1D (PRIOR ART) illustrates the arrangement of the nuclear sensors on a logging-while-drilling device.

FIG. 1D illustrates the arrangement of the nuclear sensors on a logging-while-drilling device. FIG. 1D is a diagram of the basic components for an exemplary gamma-ray density tool. This tool comprises an upper section of a bottom hole assembly including a drill collar 10. The logging tool of the present invention contains a gamma-ray source 14 and two spaced gamma-ray detector assemblies 16 and 18. All three components are placed along a single axis that has been located parallel to the axis of the tool. The detector 16 closest to the gamma-ray source will be referred to as the "short space detector" and the one farthest away 18 is referred to as the "long space detector". Gamma-ray shielding (not shown) is located between detector assemblies 16, 18 and source 14. Windows (ports) open up to the formation from both the detector assemblies and the source. The acoustic caliper 20 is inline and close to the gamma detectors (LS & SS). A layer of drilling fluid (mud) is present between the formation and the detector assemblies and source. Also shown in FIG. 1D are the lower section of the bottomhole assembly 22 and drill bit 24 and the logging-while-drilling device may contain one or more additional sensor assemblies with additional carrier sections 12.

Figure 2:
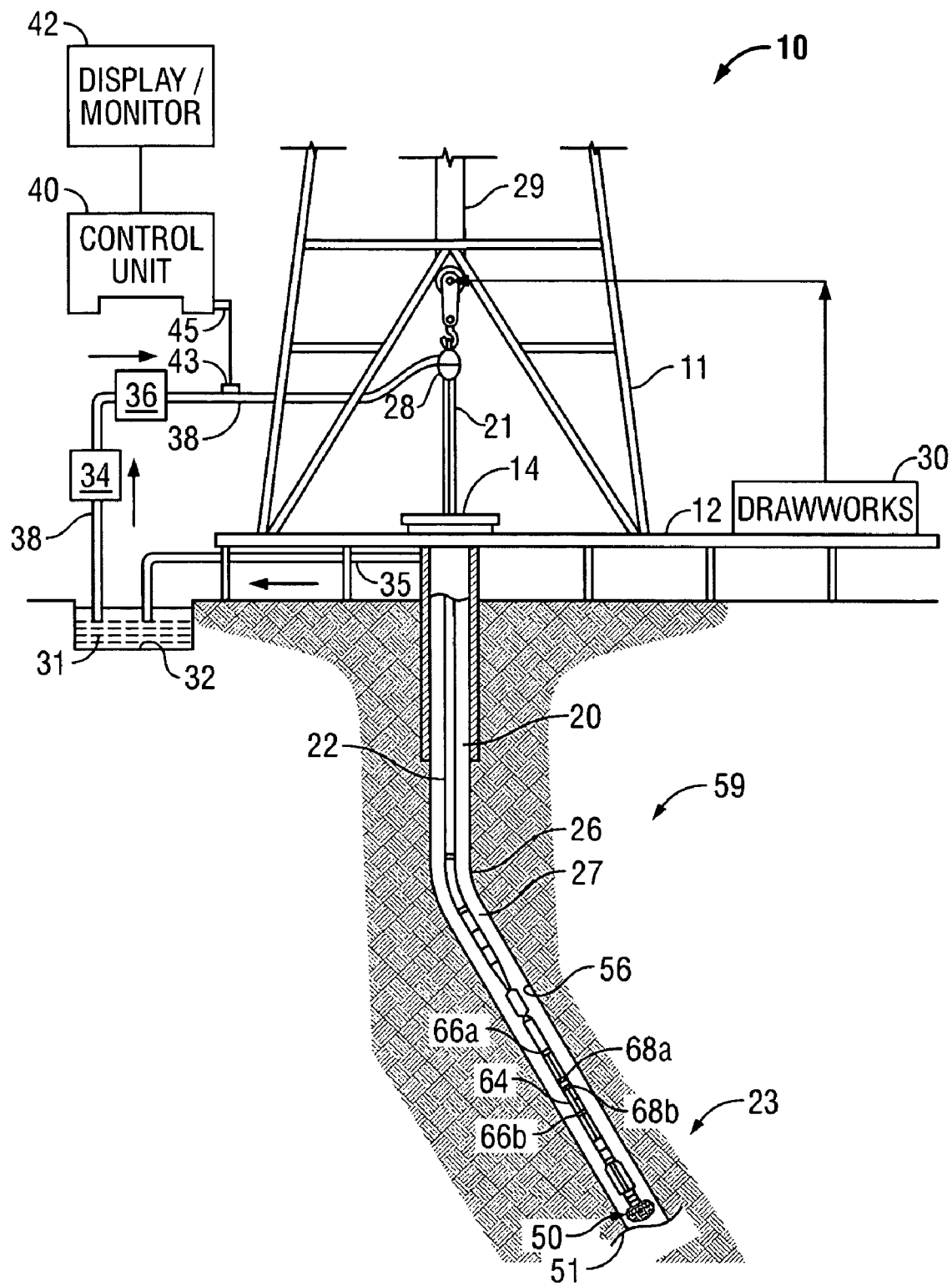
FIG. 2 (PRIOR ART) shows a schematic diagram of a drilling system having a drill string that includes an apparatus according to the present invention.

FIG. 2 shows a schematic diagram of a drilling system 110 having a downhole assembly containing an acoustic sensor system and the surface devices according to one embodiment of present invention. As shown, the system 110 includes a conventional derrick 111 erected on a derrick floor 112 which supports a rotary table 114 that is rotated by a prime mover (not shown) at a desired rotational speed. A drill string 120 that includes a drill pipe section 122 extends downward from the rotary table 114 into a borehole 126. A drill bit 150 attached to the drill string downhole end disintegrates the geological formations when it is rotated. The drill string 120 is coupled to a drawworks 130 via a kelly joint 121, swivel 118 and line 129 through a system of pulleys 127. During the drilling operations, the drawworks 130 is operated to control the weight on bit and the rate of penetration of the drill string 120 into the borehole 126. The operation of the drawworks is well known in the art and is thus not described in detail herein.

During drilling operations a suitable drilling fluid (commonly referred to in the art as "mud") 131 from a mud pit 132 is circulated under pressure through the drill string 120 by a mud pump 134. The drilling fluid 131 passes from the mud pump 134 into the drill string 120 via a desurger 136, fluid line 138 and the kelly joint 121. The drilling fluid is discharged at the borehole bottom 151 through an opening in the drill bit 150. The drilling fluid circulates uphole through the annular space 127 between the drill string 120 and the borehole 126 and is discharged into the mud pit 132 via a return line 135. Preferably, a variety of sensors (not shown) are appropriately deployed on the surface according to known methods in the art to provide information about various drilling-related parameters, such as fluid flow rate, weight on bit, hook load, etc.

A surface control unit 140 receives signals from the downhole sensors and devices via a sensor 143 placed in the fluid line 138 and processes such signals according to programmed instructions provided to the surface control unit. The surface control unit displays desired drilling parameters and other information on a display/monitor 142 which information is utilized by an operator to control the drilling operations. The surface control unit 140 contains a computer, memory for storing data, data recorder and other peripherals. The surface control unit 140 also includes models and processes data according to programmed instructions and responds to user commands entered through a suitable means, such as a keyboard. The control unit 140 is preferably adapted to activate alarms 144 when certain unsafe or undesirable operating conditions occur.

A drill motor or mud motor 155 coupled to the drill bit 150 via a drive shaft (not shown) disposed in a bearing assembly 157 rotates the drill bit 150 when the drilling fluid 131 is passed through the mud motor 155 under pressure. The bearing assembly 157 supports the radial and axial forces of the drill bit, the downthrust of the drill motor and the reactive upward loading from the applied weight on bit. A stabilizer 158 coupled to the bearing assembly 157 acts as a centralizer for the lowermost portion of the mud motor assembly.

In the preferred embodiment of the system of present invention, the downhole subassembly 159 (also referred to as the bottomhole assembly or "BHA") which contains the various sensors and MWD devices to provide information about the formation and downhole drilling parameters and the mud motor, is coupled between the drill bit 150 and the drill pipe 122. The downhole assembly 159 preferably is modular in construction, in that the various devices are interconnected sections so that the individual sections may be replaced when desired.

Still referring back to FIG. 2, the BHA also preferably contains sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 164 is preferably coupled above the lower kick-off subassembly 162 that provides signals, from which resistivity of the formation near or in front of the drill bit 150 is determined. A dual propagation resistivity device ("DPR") having one or more pairs of transmitting antennae 166a and 166b spaced from one or more pairs of receiving antennae 168a and 168b is used. Magnetic dipoles are employed which operate in the medium frequency and lower high frequency spectrum. In operation, the transmitted electromagnetic waves are perturbed as they propagate through the formation surrounding the resistivity device 164. The receiving antennae 168a and 168b detect the perturbed waves. Formation resistivity is derived from the phase and amplitude of the detected signals. The detected signals are processed by a downhole circuit that is preferably placed in a housing 170 above the mud motor 155 and transmitted to the surface control unit 140 using a suitable telemetry system 172. In addition to or instead of the propagation resistivity device, a suitable induction logging device may be used to measure formation resistivity.

The inclinometer 174 and gamma ray device 176 are suitably placed along the resistivity measuring device 164 for respectively determining the inclination of the portion of the drill string near the drill bit 150 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 155 transfers power to the drill bit 150 via one or more hollow shafts that run through the resistivity measuring device 164. The hollow shaft enables the drilling fluid to pass from the mud motor 155 to the drill bit 150. In an alternate embodiment of the drill string 120, the mud motor 155 may be coupled below resistivity measuring device 164 or at any other suitable place.

The drill string contains a modular sensor assembly, a motor assembly and kick-off subs. In a preferred embodiment, the sensor assembly includes a resistivity device, gamma ray device and inclinometer, all of which are in a common housing between the drill bit and the mud motor. The downhole assembly of the present invention preferably includes a MWD section 168 which contains a nuclear formation porosity measuring device, a nuclear density device, an acoustic sensor system placed, and a formation testing system above the mud motor 164 in the housing 178 for providing information useful for evaluating and testing subsurface formations along borehole 126. A downhole processor may be used for processing the data.

Figure 3A:
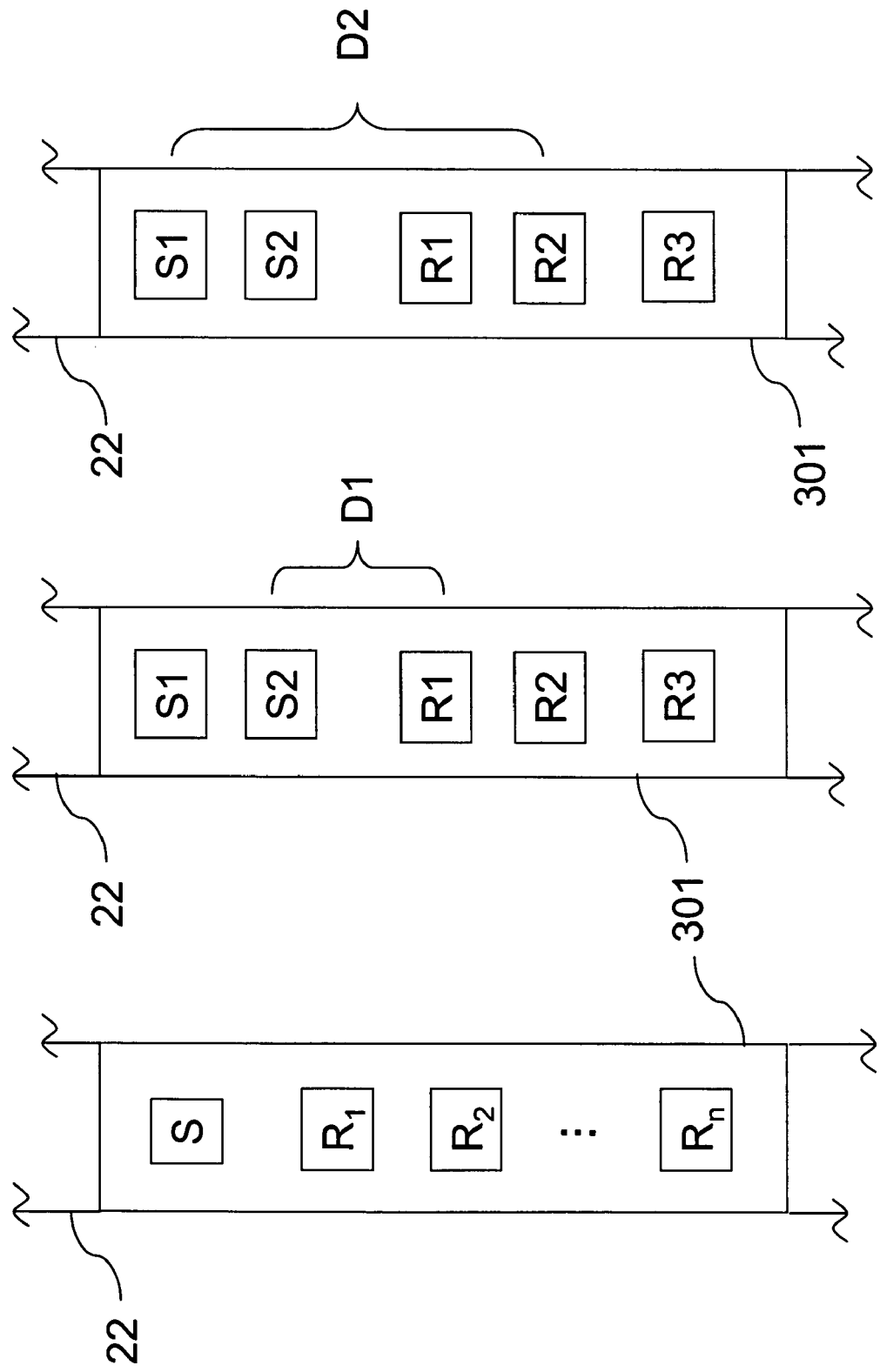
FIG. 3A illustrates schematic versions of a downhole source and sensor combinations for use with the present invention.

FIG. 3A illustrates a schematic version of a down hole tool 301 comprising a source and sensor combinations for use with the present invention. As is known to those versed in the art, more than one source S may used on a tool, and a plurality of sensors ($R_1$, $R_2$, to $R_n$) may be used. The sensors may be more than one type. The source may be any downhole source as in known in the art, for example, an acoustic, gamma ray or a resistivity source.

Figure 3B:
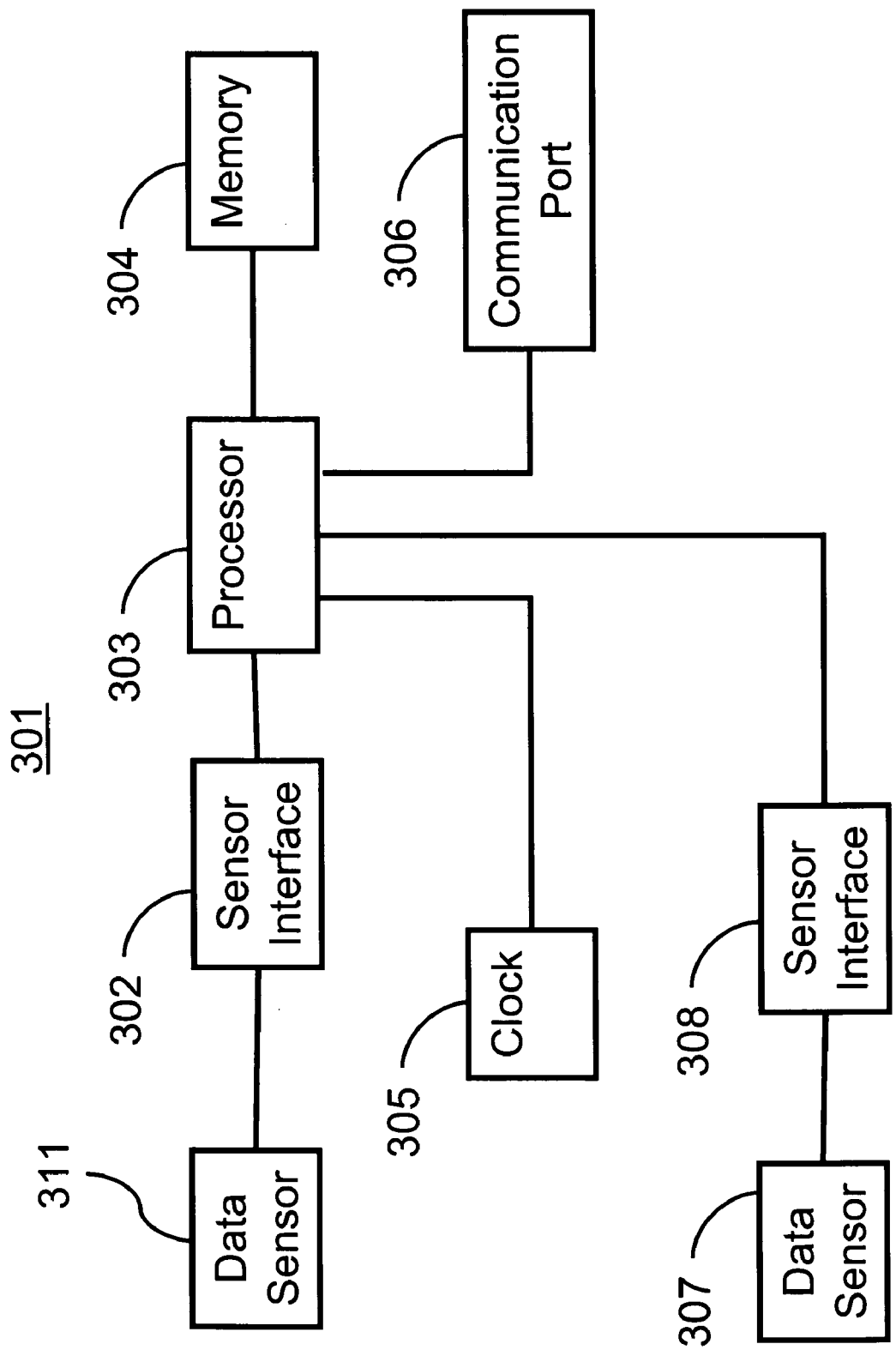
FIG. 3B is a schematic of a downhole data acquisition system for use in one embodiment of the present invention.

Referring to FIG. 3B, the (downhole) data acquisition tool 301 may, in one non-limiting embodiment, include a combination of sensors 311 such as for resistivity, density, acoustic or radiation measurements as known in the art, along with suitable sensor interface circuitry 302, a processor 303, and memory 304 for storage of programmed instructions and storage of received downhole data. A real time clock circuit 305 is also included in the data acquisition tool 301 to provide time stamps for the received seismic signals. The surface located real-time clock and the seismic receiver located real-time clock 305 are synchronized at the surface before deploying the sensors of 301 into the wellbore or into the drill string. A communications port 306 can be included to download program instructions to memory 304 and to upload stored seismic data to a surface system such as a surface processor or control unit. The receiver is powered by batteries (not shown) or other energy source (e.g., fuel cells, downhole generator, wireline, etc.). A similar receiver that is deployable by slick-line is described in U.S. Pat. No. 5,555,220 to Minto, assigned to the assignee of this application and incorporated herein by reference. While data receiver system 301 may be in the terminal position within a drill string, the location and number of tool deployments are flexible. the (downhole) data acquisition tool 301 may further comprise additional combinations of sensors 307 such as for resistivity, density, acoustic or radiation measurements as known in the art, along with suitable sensor interface circuitry 308, which also tie into a processor 303, and memory 304 for storage of programmed instructions and storage of received downhole data.

As the downhole tool 301 passes through the borehole 126, the sources and sensors sample the earth formation adjacent to the borehole, and overlapping data samples are acquired along the wellbore traverse. Data from each sensor is collected into a data series. Each data series may represent measurements in time and/or depth. There are several issues to be addressed by the present invention, including denoising the data series, depth shifting, signal resolution and artifact removal. Subsequently the data series may be further denoised or filtered. Often, the best way to deal with these issues by initial denoising, then accounting for the depth shift, removing data acquisition artifacts in the signal, then adjust the signal resolution by resolution matching.

Figure 4A:
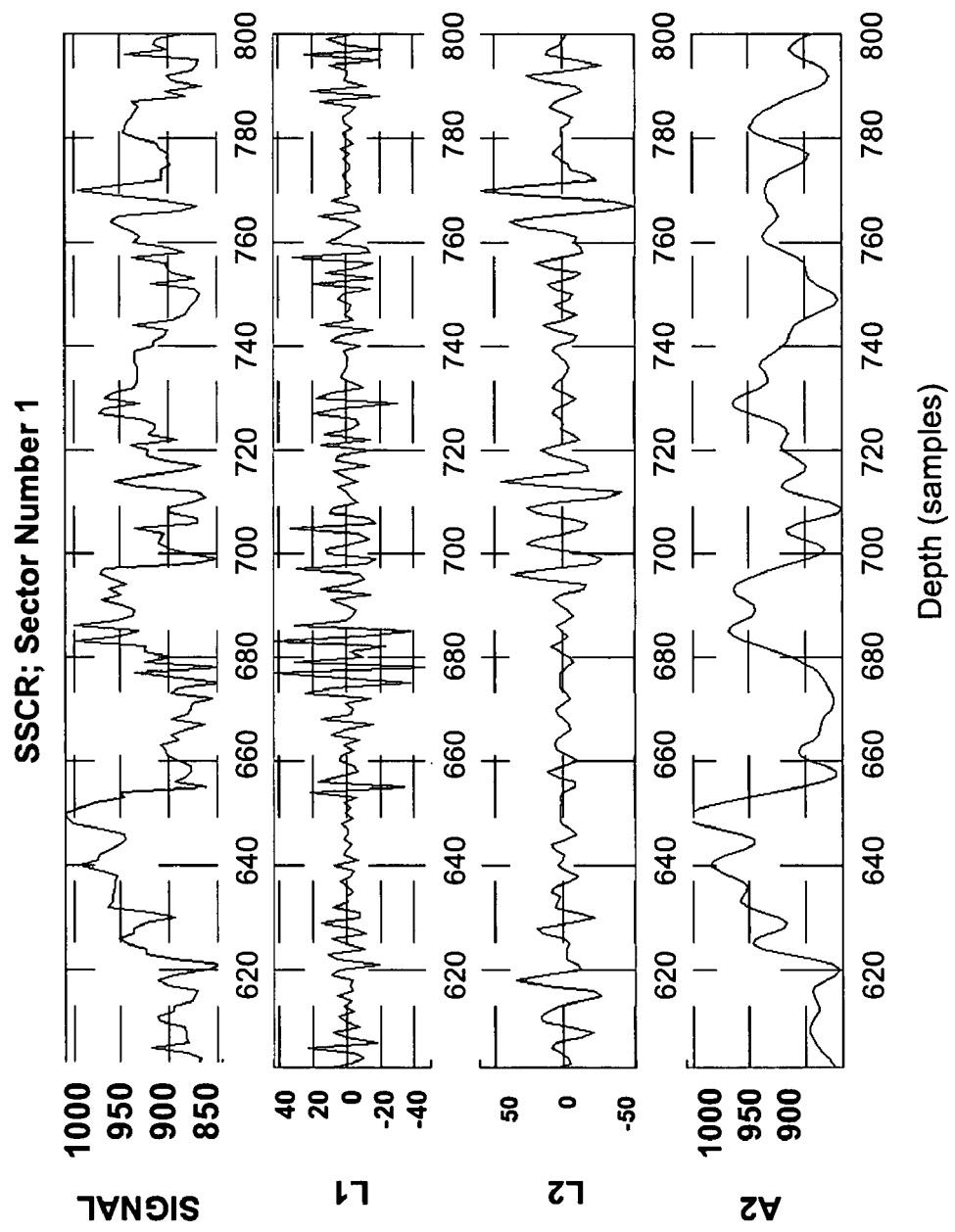
FIG. 4A illustrates denoising a data series using the application of a multi-resolution wavelet transform.

Each data series can be denoised using multi-resolution wavelet transform methods. Such methods are well known to practitioners versed in the art of signal processing and are not discussed in detail here. The multi-resolution wavelet transform methods may be 1-D or 2-D, and the analysis performed up to an arbitrary number of levels. The data series that the denoising can be applied to may be depth data or time data. For a density data series, the multi-resolution wavelet transform, which may include analysis and filtering, can be applied to denoise the SS density (or count rate) and LS density (or count rate) data. FIG. 4A illustrates the 1-D denoising using the application of a multi-resolution wavelet transform with two levels L1 and L2 which have been extracted from a density data series labeled Signal. After separately filtering L1 and L2, as or if required, the data are combined and the output is illustrated as the short-spaced count rate (SSCR) or SS density data series A1. Denoising can be applied to data long spaced count rate (LSCR) or LS density data in a similar manner, or any other type data series. The application of 2-D multi-resolution wavelet analysis is straightforward and not discussed further here. An example of 2-D applications may be found in Wong, Kwo-Jyr, and C. C. Jay Kuo (1993) "A Full Wavelet Transform (FWT) Approach to Image Compression," *Image and Video Processing*, Bellingham, Wash., SPIE volume 1903: 153-164.

Depth shifting is done by performing two adjustments. One adjustment is a physical translation of one or more signals or portions of signals, which may be accomplished by a depth or time reassignment. A second adjustment matches the resolution of adjacent, contemporaneous or coincident signals.

Figure 4B:
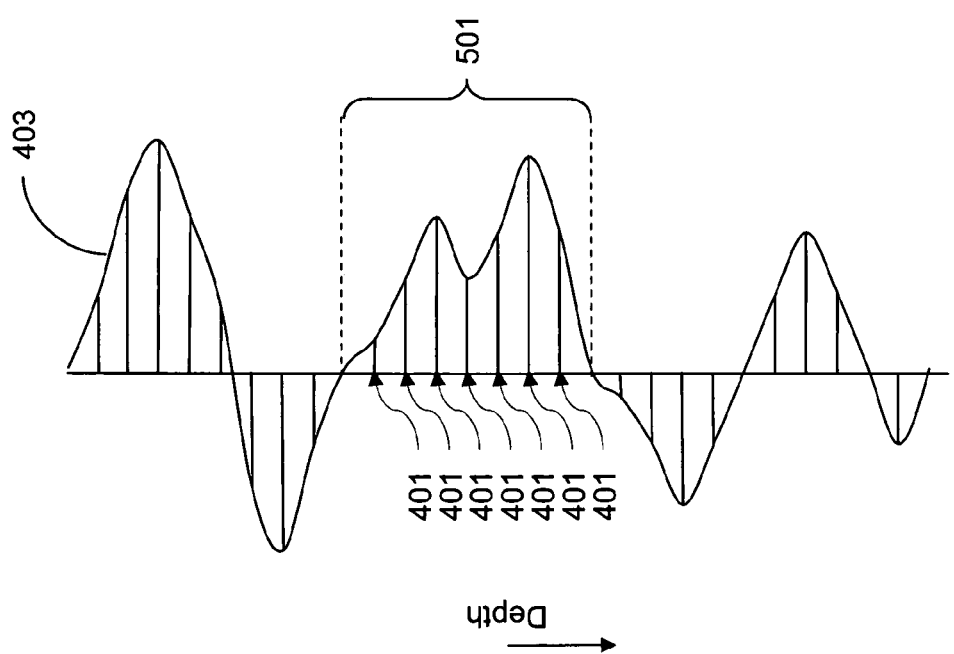
FIG. 4B illustrates a data series signal from a source-detector signal schematically shown as a digitized signal series.

FIG. 4B illustrates a data series. The data series can be a portion of a depth (or time) series signal from a source-detector signal schematically shown as a digitized signal series 401 with an analog signal representation 403 overlaid for display. An arbitrary portion 501 of the signal is illustrated. This portion 501 will be schematically illustrated with respect to similar signals from substantially coincident depths to illustrate both depth matching (physical translation) of signals and to illustrate resolution matching.

Figure 5A:
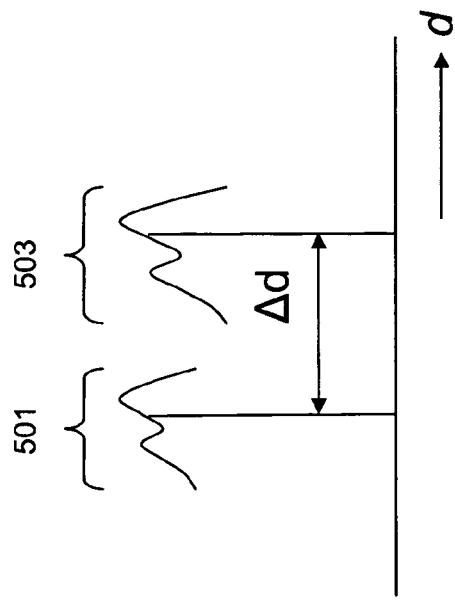
FIG. 5A illustrates a depth separation between a portion of a depth data series.
Figure 5B:
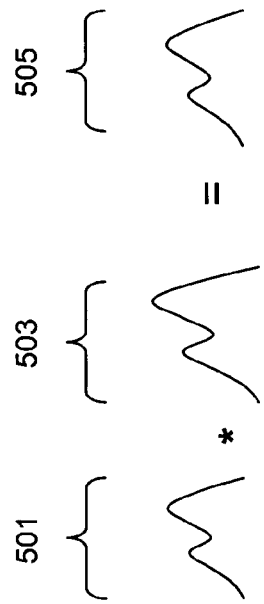
FIG. 5B illustrates an adjustment of the resolution or shape of signals representing signals traversing earth formation adjacent to the well bore.

An arbitrary portion 501 of a signal is illustrated in FIG. 5A relative to a second portion of another signal 503 showing the depth (or time) shifting reassignment represented by Δd. FIG. 5B illustrates adjusting the resolution or shape of signals representing signals traversing earth formation adjacent to the well bore.

FIG. 5A illustrates a depth separation between a portion of a depth series 501 and a similar depth series 503. Depth series 501 and 503 may come from different sensors but represent data traversing the same or similar depths along a wellbore. The time or depth difference (represented here by Δd) may be corrected to bring the signals into substantial alliance. While data may be resampled (for example, oversampled) prior to shifting the data, data may simply be shifted to the nearest sample and further differences accounted for in the resolution adjustment following shifting.

FIG. 5B illustrates how depth series 501 and depth series 503 may be combined to produce an adjusted depth series 505 representing a composite signal that has traversed substantially the same time or depth interval adjacent to the well bore. The symbol '*' is used to designate any form of processing signals known in the art to combine signals. For example, using a "B-spline" fit is a general technique that will fit samples together and produces a fairly smooth result while preserving the phase of the data. Optionally, resampling may be used with the spline, but this is not required.

Reference data may be stored at the surface or in the downhole tool. As illustrated in FIG. 6 a table of time versus depth may be developed a priori, or developed as data are collected. For example D1 and D2 (see also FIG. 3) may represent the same time range in the table and also the data r(1,1) collected for D1 and the data r(1,2) collected D2. As is known in the art, D1 may represent a short-spaced (SS) measurement, D2 a long spaced (LS) measurement.

A conventional time to depth conversion may be performed to depth match signals that represent substantially the same portion of earth formation adjacent to a well bore. However, conventional time to depth conversion may introduce inaccuracies into to the measurements when the signals are subsequently combined. Depth matching may be improved by determining a shift of samples that creates close alignment between signals that represents the data for a depth D1 with another signal that represents depth D2 (e.g., FIG. 5A). Various ways of determining this shift of samples are well known, for example correlation. So for signals that represent substantially similar depth ranges, adjustments to the signals are performed by first matching the depth to the nearest sample, matching the resolution of the signals, which may comprise the B-spline (e.g., FIG. 5B), and the data may subsequently be further filtered.

The depth adjustment 701 is illustrated in the flow chart of FIG. 7. The constant shift 703 may be a shift to the nearest sample. The non-constant shift 705 component of the depth adjustment 701 is comprised of both applying a B-spline 707 and re-aligning the feature 709. The B-spline application preserves the phase of the data and resampling the data is not necessary.

Upon completion of depth matching, resolution matching is undertaken. Resolution of signals may vary due to factors such as depth of penetration of the signal into the earth formation and the aperture range of source emission. FIG. 8 illustrates an example of the resolution difference between signals that are effectively averaged over an aperture range associated with the source, for example using a gamma ray source. A source S81 having a source aperture proportional to 811 emitting a source signal into a near bore zone 16 and earth formation 18. The signal 801 is an average over the range determined by the aperture of the source emission. Signal 803 associated with source S83 is an example of a signal averaged over a wider aperture range 813 than signal 801. Signal 801 is representative of a higher resolution signal compared with signal 803, because the signal emitted over the aperture range 813 is effectively averaged over the broader range. Signal resolution matching may be adjusted from an effectively narrow signal to a broad signal or vice versa.

Figure 9A:
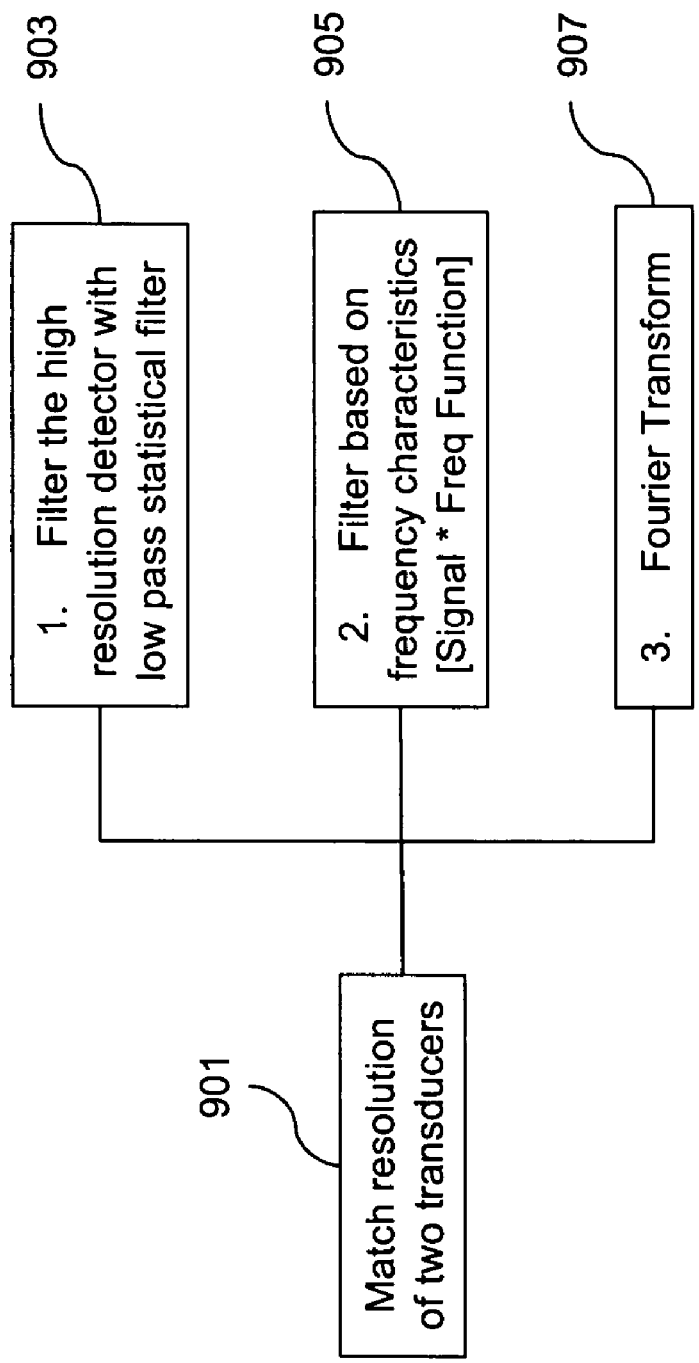
FIG. 9A is a flow chart of resolution matching options.

Resolution matching 901 of signals is illustrated with a flow chart of options in FIG. 9A. There are at least three ways for matching the resolution of two transducers (or sensors): 1) Filter the high resolution detector with low pass statistical filter 903; 2) Filter based on frequency characteristics 905 (e.g., a signal convolved with a data dependent frequency function) and 3) a Fourier Transform 907.

Figure 9B:
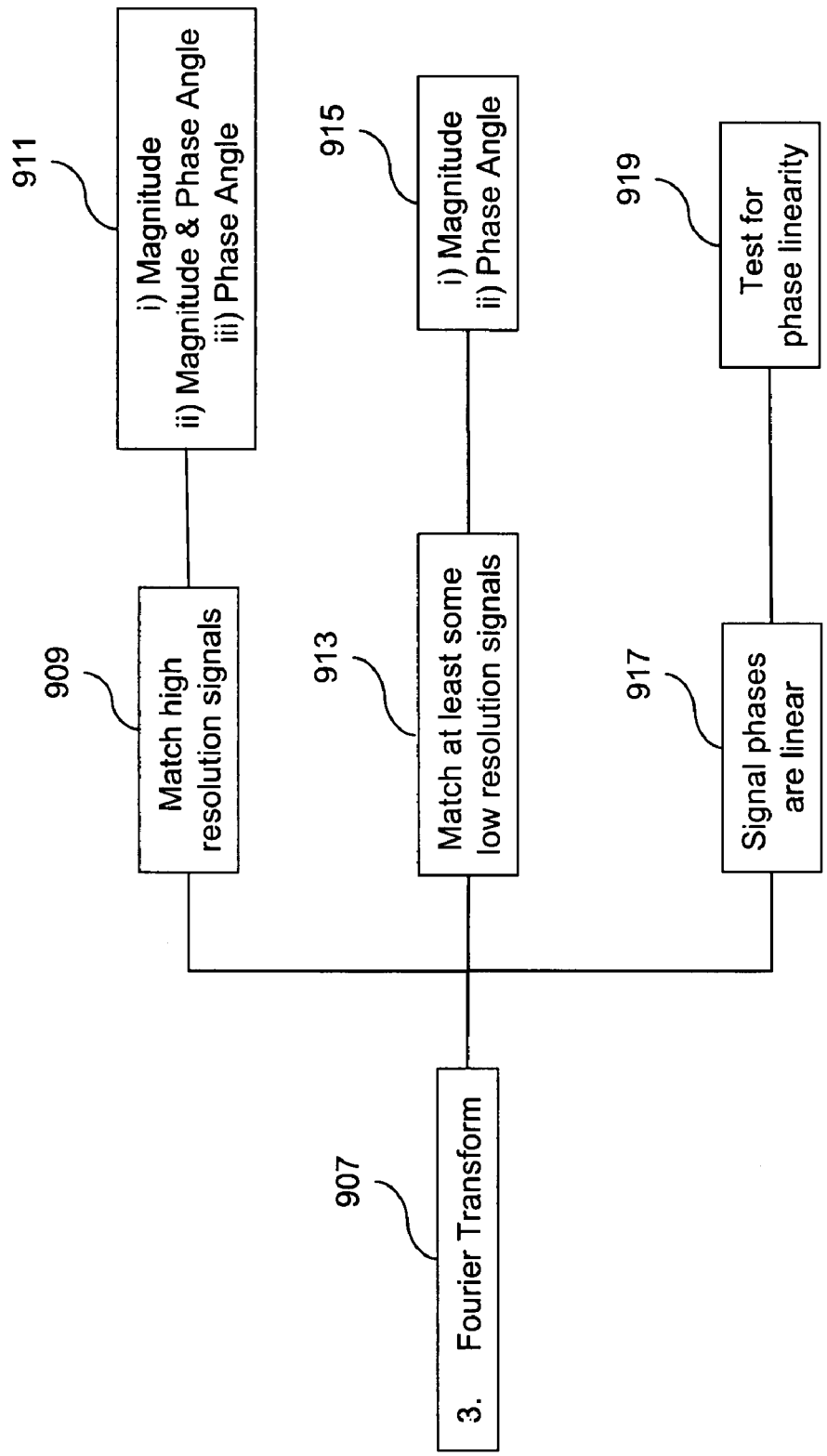
FIG. 9B is a flow chart of options for applying a Fourier transform for resolution matching.

As illustrated in FIG. 9B the Fourier Transform 907 may be applied in three ways depending on whether the signals to be matched are high resolution, contain some low resolution signals, and/or whether the phase angles of the signal to be matched have linear phase. For matching high resolution signals 909, a Fast Fourier Transform (FFT) may be used and the output data 911 divided into i) magnitude, ii) magnitude and phase angle) and iii) phase angle. For matching at least some low resolution signals 913, an FFT may be used and the output data divided into 915 i) magnitude and ii) phase angle. When the phase of the signals to be matched are fairly linear 917, signals may be directly combined in frequency space. Whether the signals are sufficiently linear may be determined by testing for phase linearity.

Phase linearity of signals may be determined by cross-plotting the phases of the signal as illustrated in FIG. 10. For example using the data from FIG. 6, the phase of the data for r(1,1) would be plotted against r(1,2) and r(1,2) would be plotted against r(1,3) and so on. A predetermined excursion value, or average of the excursion value from a best fit line 1003 to the data is used to determine whether the data are suitable for directly combining signals using the FFT.

Where available, data that are suitable for directly combining with FFT are most desirable. Data may be divided up into sections as data are acquired and tested for phase linearity.

Figure 11:
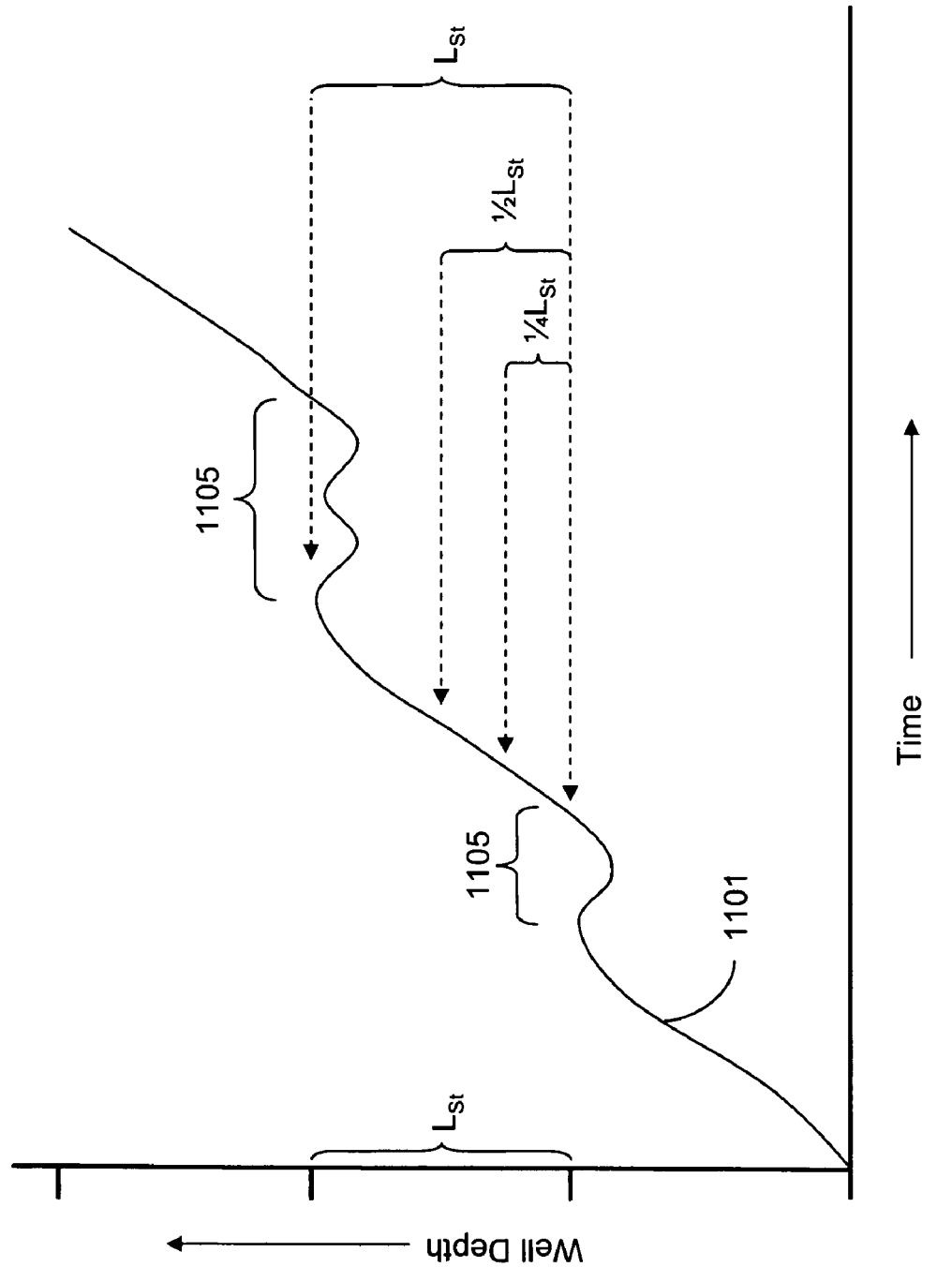
FIG. 11 illustrates a graph of data acquired for well depth versus time.

Data are acquired during drilling and are often acquired in contiguous depth segments (e.g. 90 foot segments) since drill pipe is added in stands (e.g. 90 foot stands) to operating drill strings. A graph of data acquired for well depth versus time is illustrated in FIG. 11. The plotted depth versus time function 1101 is shown as fairly smooth function for illustrative purposes; those versed in the art know the actual penetration graphs may be somewhat more variable. The slope of function 1101 at any particular time (or averaged over a time period) represents the rate of penetration (ROP) of the drill string. As is well known, during time periods when stands are added the drill string may stop, reverse directions one or more times depending on downhole drilling conditions. The data acquired during these "clean-up" periods 1105 may yield repeated data intervals. For an arbitrary length string distance $L_{St}$ the acquired data may be tested for linearity using all the data acquired during the length of drilling one stand distance $L_{St}$ of depth. If the conditions for phase linearity (917) are not met, the data may tested over $\frac{1}{2}L_{St}$ or over $\frac{1}{4}L_{St}$ as illustrated schematically in FIG. 11. As a practical matter, if acquisition over a distance of $\frac{1}{4}L_{St}$ is not linear, the other data combination methods (e.g. 909 or 913) may be applied.

After the data have been depth matched and resolution matched, the data may be filtered to remove the dynamical effects of the data acquisition on the measurements. The filtering is applied to address the problems of environmental noise and borehole spiral. These problems effect both the measurement and the images made from the measurements. Drilling conditions may cause a borehole to have imperfect non-cylindrical geometries, for example acquiring the shape of a corkscrew. Most logging tools are longer than the wavelength of the spirals or other non-cylindrical effects, and therefore see it as a change in standoff or a change in hole size. For this reason, the spiral is often observed as a wave on the caliper log. A spiral hole affects measurements sensitive to standoff, such as induction and neutron porosity, and may affect pad tools, if they cannot follow the changes.

Standoff is the distance between the external surface of a logging tool and the borehole wall. This distance affects the response of some logging measurements, for example induction and neutron porosity logs. For resistivity tools, the standoff is accounted for in a borehole correction. Neutron porosity may be corrected for separately. In a smooth hole, standoff may be constant and determined by the geometry of the logging tool string and the borehole. Standoff may vary with depth.

Figure 12:
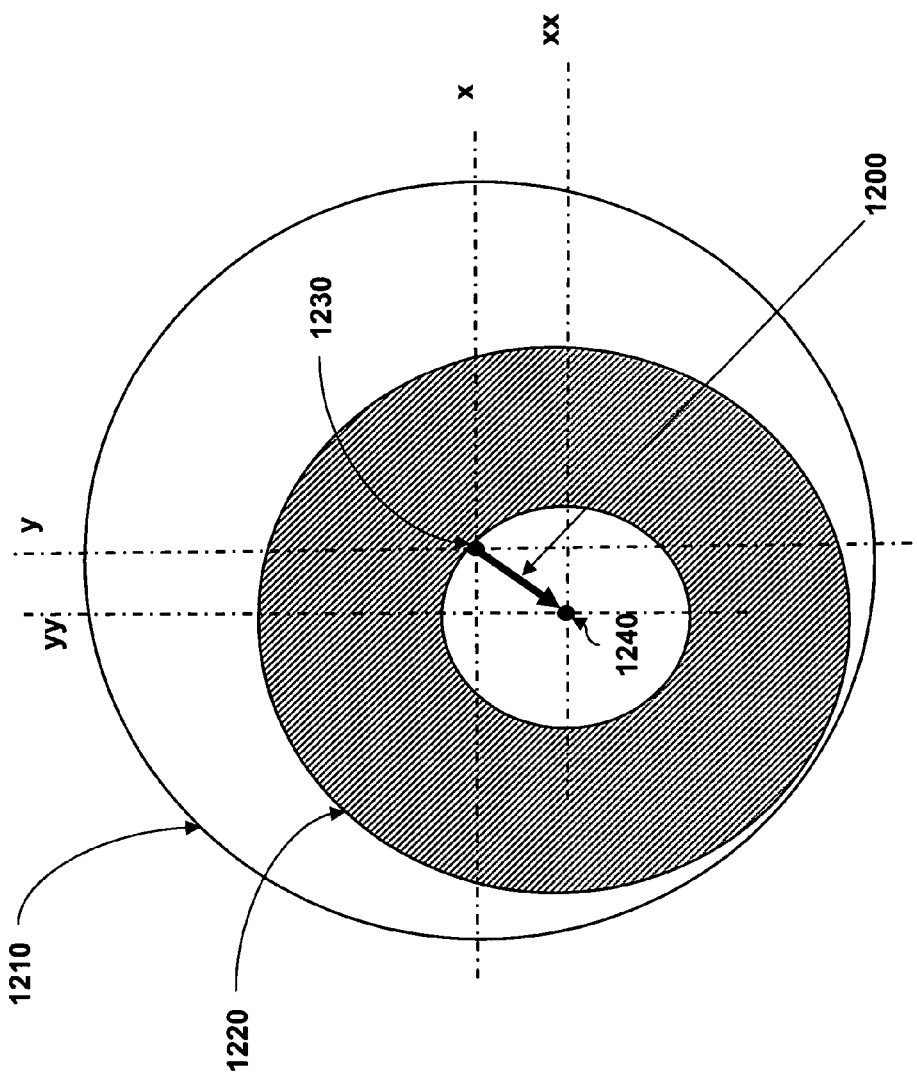
FIG. 12 illustrates a difference vector from a borehole center to a downhole tool center.

Eccentering refers to the amount by which an object is off-center with respect to another; in this case the displacement between the axis of a logging tool and the borehole axis. The eccentering may be compensated for by measuring standoff accounting for the tool position at depth within the borehole. FIG. 12 illustrates the difference vector 1200 between a borehole 1210 with a borehole center at 1230 and a downhole tool 1220 with a downhole tool center 1240. The difference vector 1200 at each depth may be calculated as distance and direction from borehole center 1230 located at the intersection of axes x and y to downhole tool center 1240 located at the intersection of axes xx and yy.

Figure 13A:
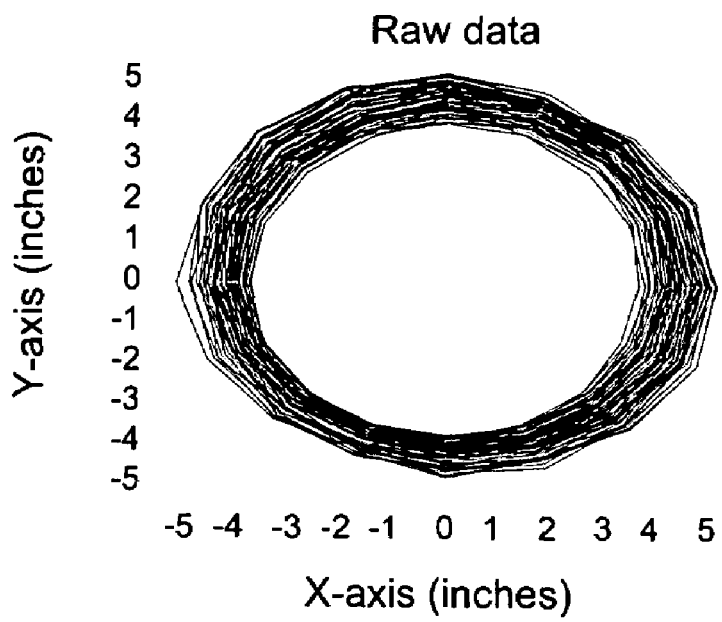
FIG. 13A illustrates raw eccentering data from measurements of a tool in a pipe having an elliptical geometry.
Figure 13B:
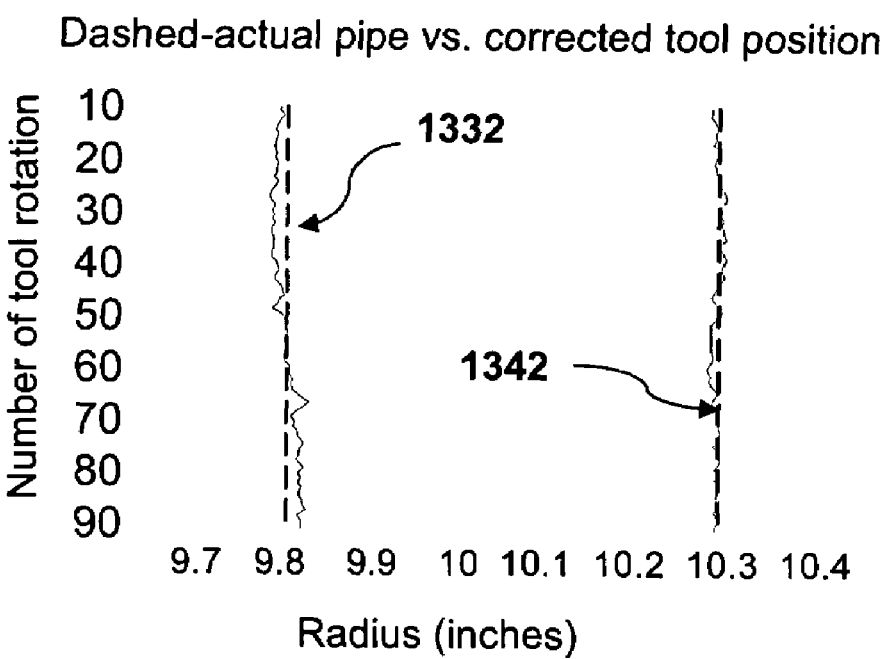
FIG. 13B illustrates an actual pipe position relative to a corrected tool position.
Figure 13C:
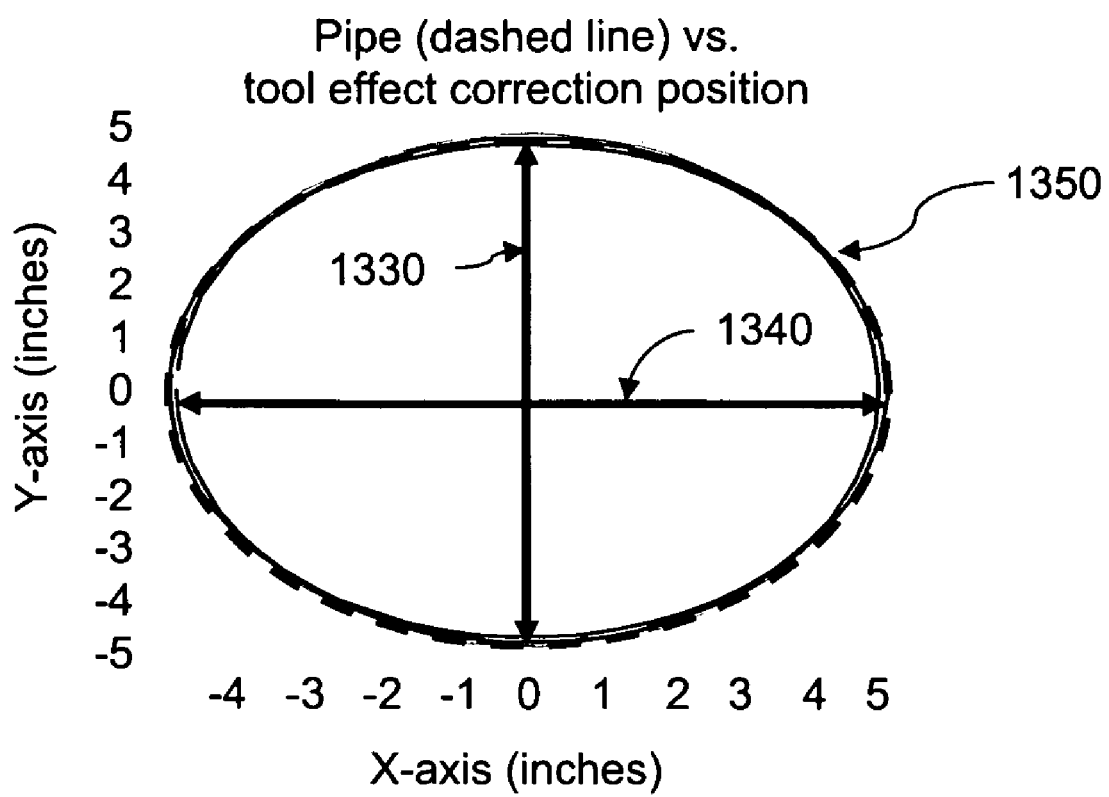
FIG. 13C illustrates a pipe position relative to data after a tool effect correction.

FIG. 13A illustrates raw eccentering data from measurements of a tool in a pipe having an elliptical geometry. When the standoff position around the circumference of a borehole or pipe is known by magnitude and direction, the geometry related to the tool effect may be removed as illustrated with reference to FIG. 13B. In FIG. 13B the minor axis 1330 and major axis 1340 are shown relative to the elliptical shape of the pipe/borehole 1350. FIG. 13C illustrates the actual pipe (shown as the dashed lines) relative to the corrected tool position shown (solid lines) for the minor ellipse axis 1332 and major ellipse axis 1342 of the pipe.

Figure 14:
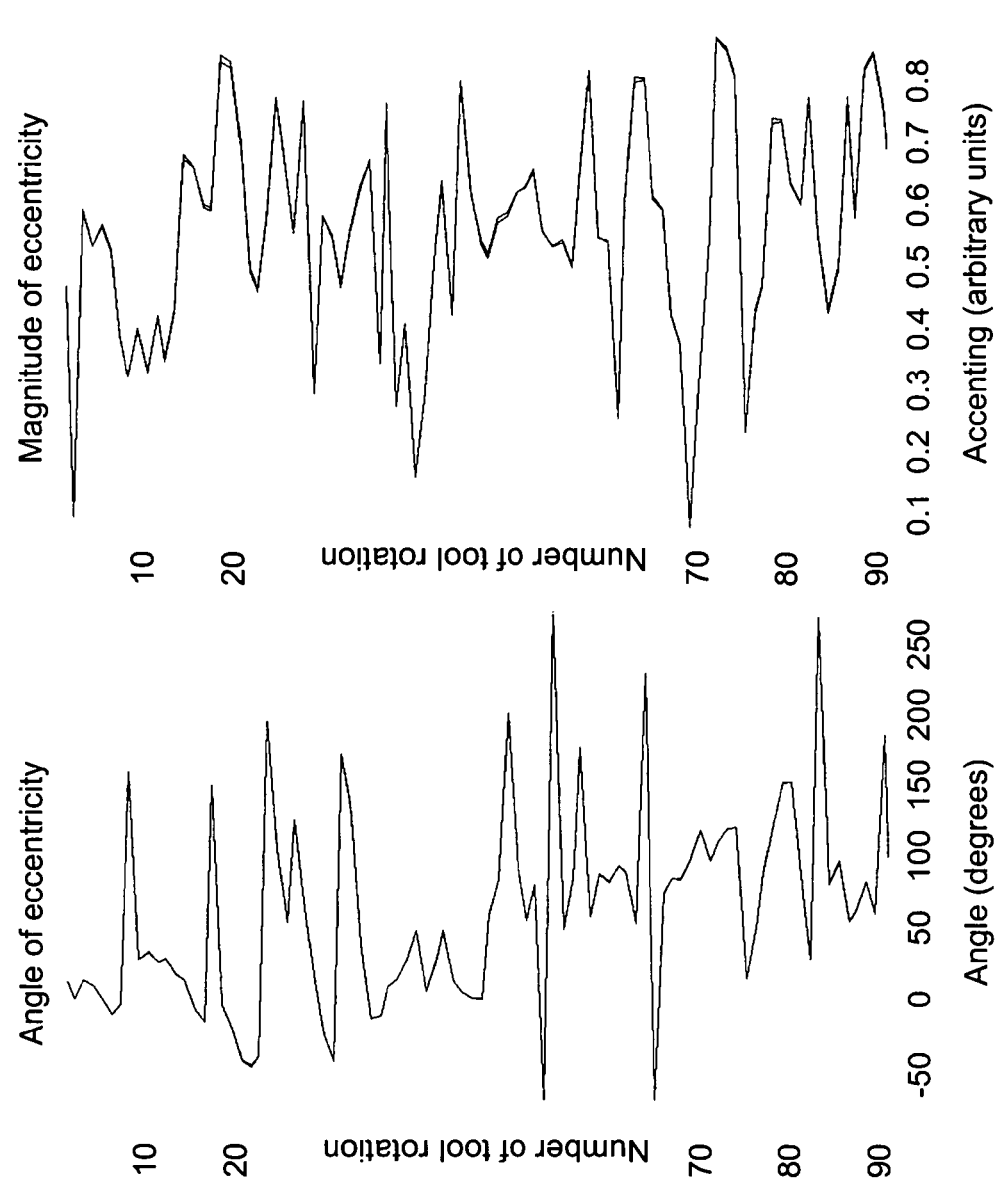
FIG. 14 illustrates the angle of eccentricity and the magnitude of the eccentricity plotted together and relative to the tool rotation.

FIG. 14 illustrates the angle of eccentricity and the magnitude of the eccentricity plotted together and relative to the tool rotation. These angle and magnitude data may be used to account for the position of the tool and to position the data relative to the borehole with increased accuracy.

Figure 15A:
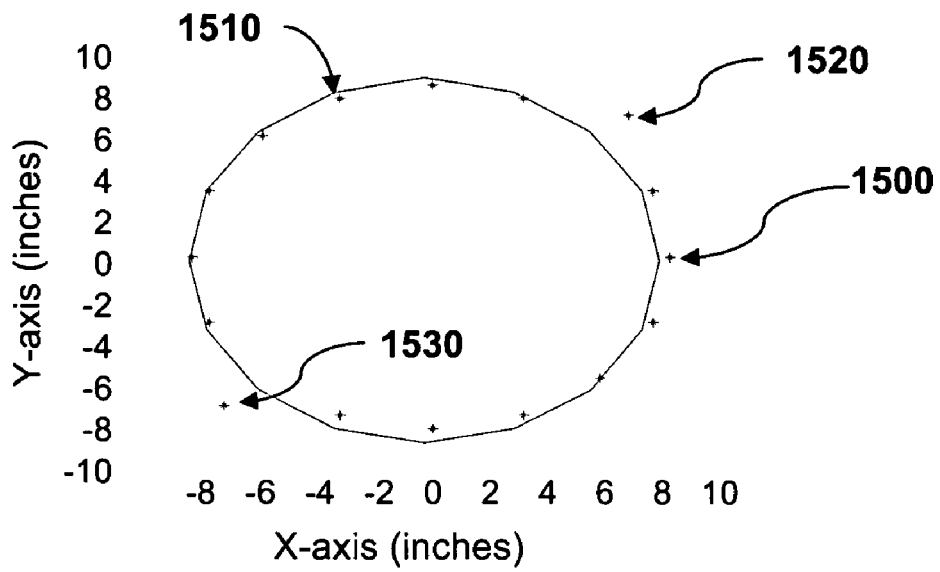
FIG. 15A represents sampled sidewall positions relative to a borehole position.
Figure 15B:
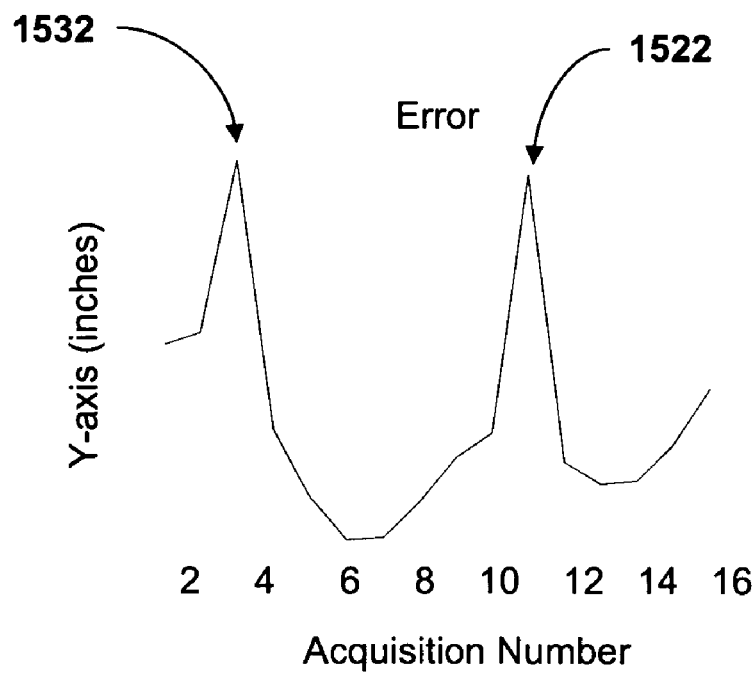
FIG. 15B illustrates error relative to sampled sidewall positions for FIG. 15A.
Figure 15C:
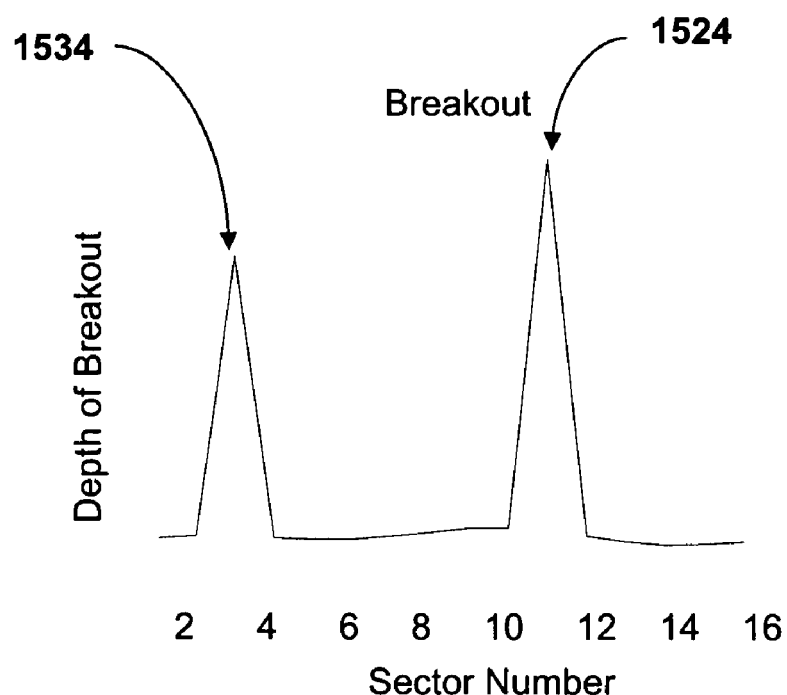
FIG. 15C illustrates depths of sidewall breakouts.
Figure 15D:
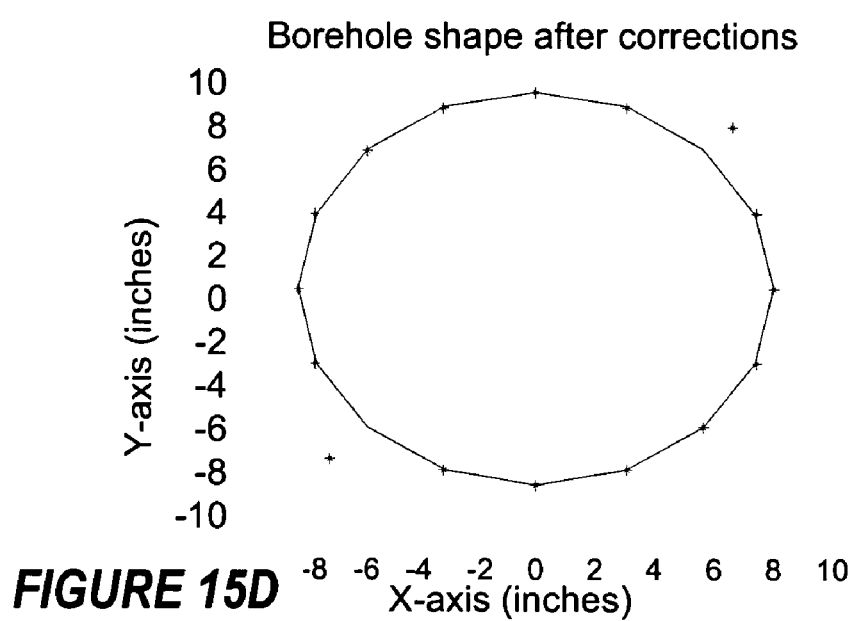
FIG. 15D illustrates data positions relative to a borehole after corrections for eccentering and breakouts have been applied.

When acquiring borehole data, breakouts in boreholes or reflections from cuttings suspended or otherwise present within the borehole may lead to problematic data leading to inaccurate imaging of bedding or other features, since accounting for eccentering as shown above is not adequate. These problems may be accounted for by recognizing and removing breakouts or interfering cuttings data. Breakouts may be recognized and associated data subsequently removed if the data position reading or error value exceeds a threshold. For example, borehole data illustrated in FIG. 15A represents sampled sidewall positions 1510 relative to borehole position 1500. Borehole sidewall position may be determined by any known method, for example a caliper measurement. Sidewall position 1520 and 1530 are data points with position values associated with borehole sidewall breakouts. FIG. 15B illustrates the data position error relative to borehole position 1500. The error may be used to determine the depth of the breakouts. As illustrated in FIG. 15C the depths of the breakouts are indicated at 1524 and 1534 as varying from borehole position 1500. The error associated with these breakout data indicated that associated reading may be removed or positioned more correctly to improve the imaging data. FIG. 15D illustrates the positioning of sidewall data measurements after application of corrections for eccentering and the accounting for breakout data outside an error threshold. Note that it is possible to determine the size, depth and position of sidewall borehole breakouts. The data associated with the breakouts may then be filtered or removed from the data.

Figure 16A:
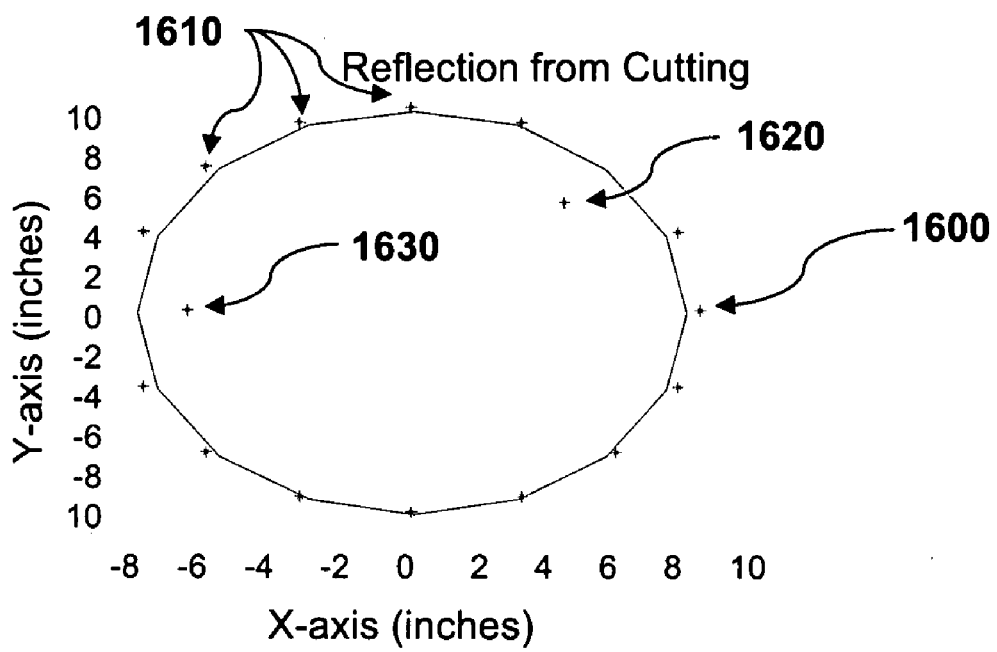
FIG. 16A represents sampled sidewall positions relative to a borehole position.
Figure 16B:
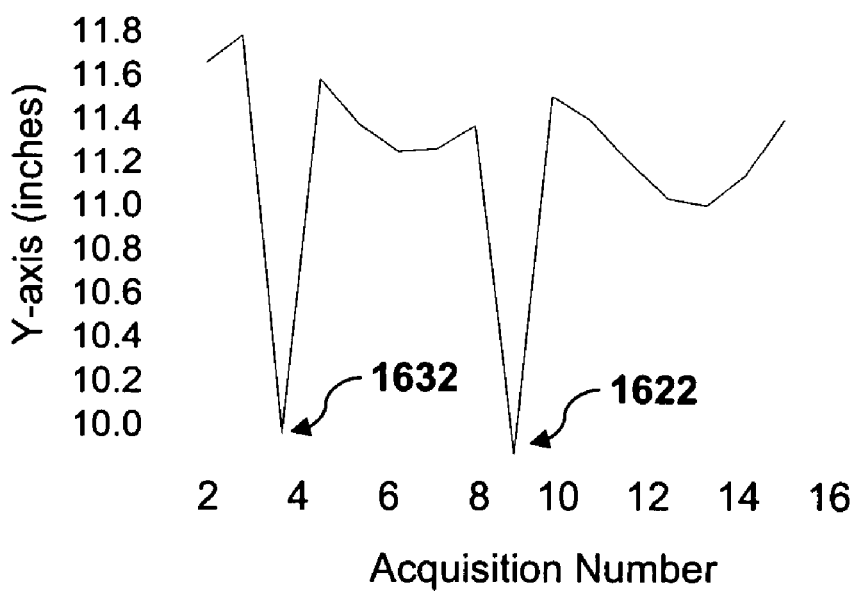
FIG. 16B illustrates error relative to sampled sidewall positions for FIG. 16A.
Figure 16C:
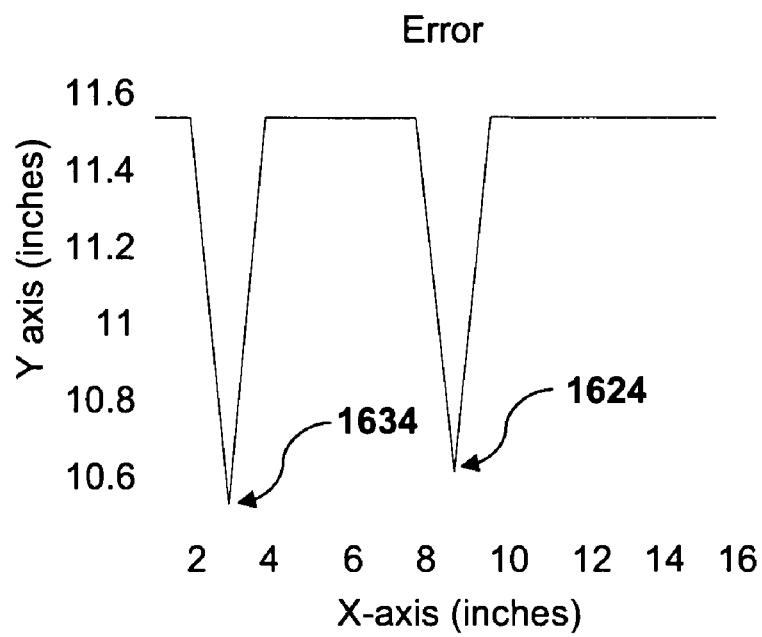
FIG. 16C illustrates positioning error due to reflections from cuttings.
Figure 16D:
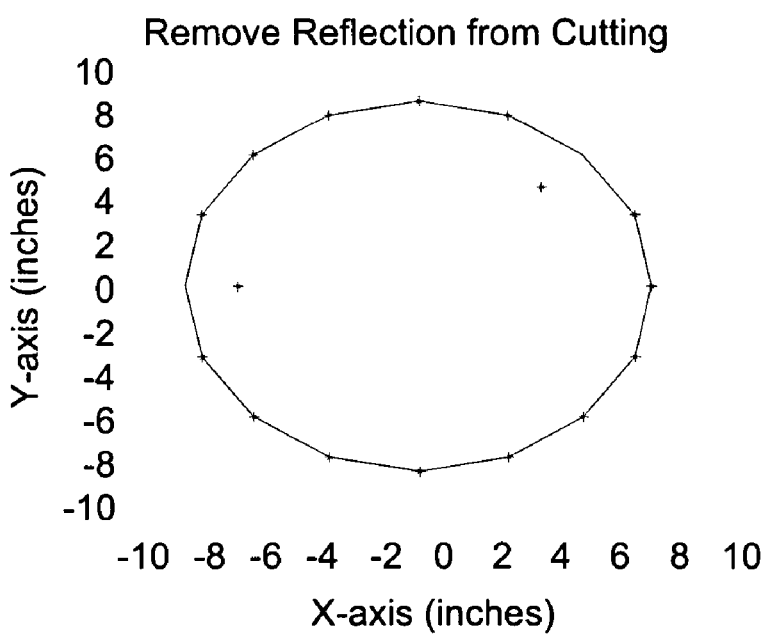
FIG. 16D illustrates data positions relative to a borehole after corrections for eccentering and cutting reflections have been applied.

FIG. 16A illustrates sampled sidewall positions 1610 relative to borehole position 1600. Sidewall position 1620 and 1630 are data points associated with reflections from borehole cuttings as opposed to reflections representing sidewall data. FIG. 16B illustrates the error relative to borehole position 1600. The error may be used to determine the position of the cuttings relative to the borehole sidewall. As illustrated in FIG. 16C the positions of the cuttings are indicated at 1524 and 1534 as varying more than some threshold value from borehole position 1600. The error associated with these cuttings reflection data indicate that associated readings or data may be removed to improve the acquired data set and subsequent borehole imaging. FIG. 16D illustrates the positioning of sidewall data measurements after application of corrections for eccentering and the accounting for cuttings data outside an error threshold.

FIG. 17 illustrates one way data may be gathered for processing. A time value associated with a depth along a borehole is also associated true vertical depth (TVD) and the data collected for the TVD may contain, for example, eight sectors of data acquired at different azimuths as the tool rotates. These TVD's may represent a range of depth that is associated with the sector data, and this depends on the rate of penetration and data acquisition rates. Data acquired with a rotating drill string are referred to as spiral data.

Processing the spiral data to account for rotational and penetration effects involves unwrapping the data and accounting for periodicity in data. The spiral data will have a substantially constant frequency over continuous segments of the data. The frequency is related to the rate of rotation of the logging/drilling tool and the ROP. The data may be transformed to frequency space and notch filtered to obtain a notch filtered data set. The notch filtered data set is then subtracted from the original unfiltered data set to obtain a difference data set. This difference data set contains both the unwanted spiral effect as well as good data that are positioned near the spiral effect frequency in frequency space. The tool rotation spiral effect remaining in the difference data is then removed from the difference data set by filtering to produce a filtered difference data set. This filtered difference data set is added back to the notch filtered data set to obtain the final result data which has the periodicity related to acquisition dynamics removed.

Figure 18:
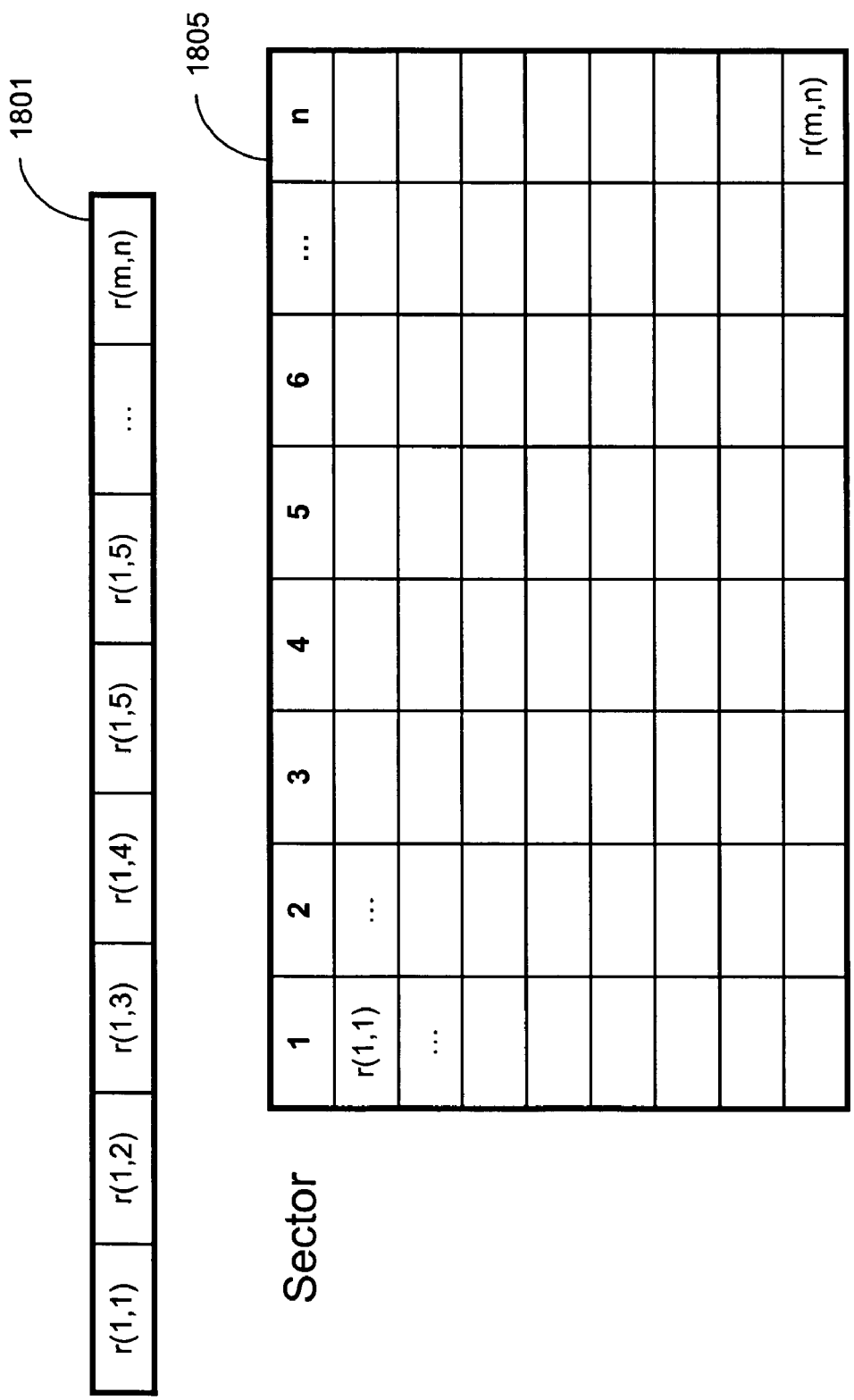
FIG. 18 illustrates representing a data vector as a data matrix.
Figure 19:
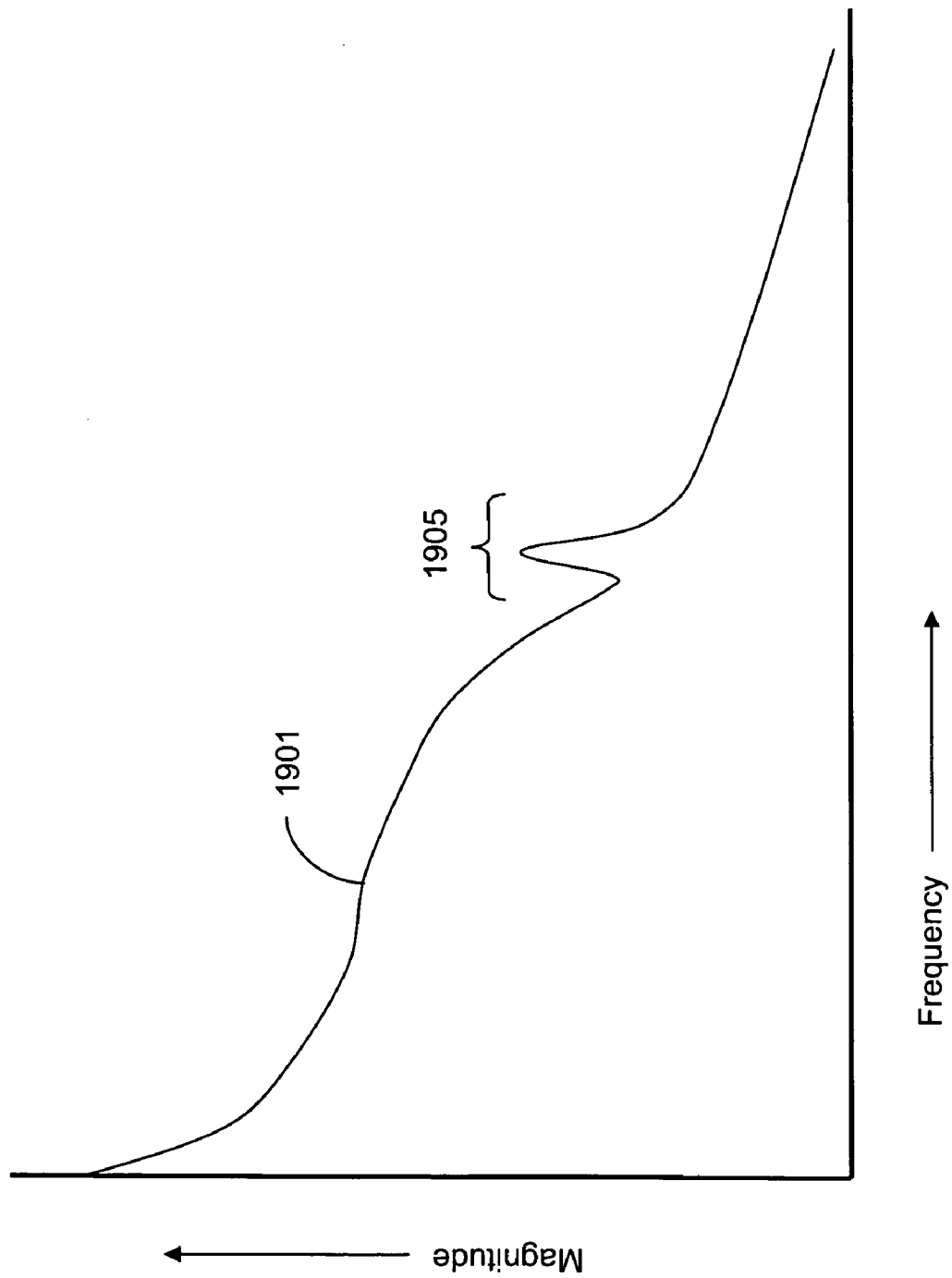
FIG. 19 illustrates a frequency spectrum of a difference data set.

As illustrated in FIG. 18 a difference data set may be converted from a vector 1801 to sector data as a matrix 1805. The length of the sectors (whether columns or rows) of the matrix may vary and be chosen according to the dominant frequencies in the data to be addressed. An FFT is performed on all the sectors and the magnitudes of the frequency responses plotted as illustrated in FIG. 19. A frequency spectrum 1901 for the sectored difference data will have a frequency anomaly 1905 in the frequency spectrum related to tool rotation. This anomaly 1905 can be filtered from the difference data set.

Figure 20:
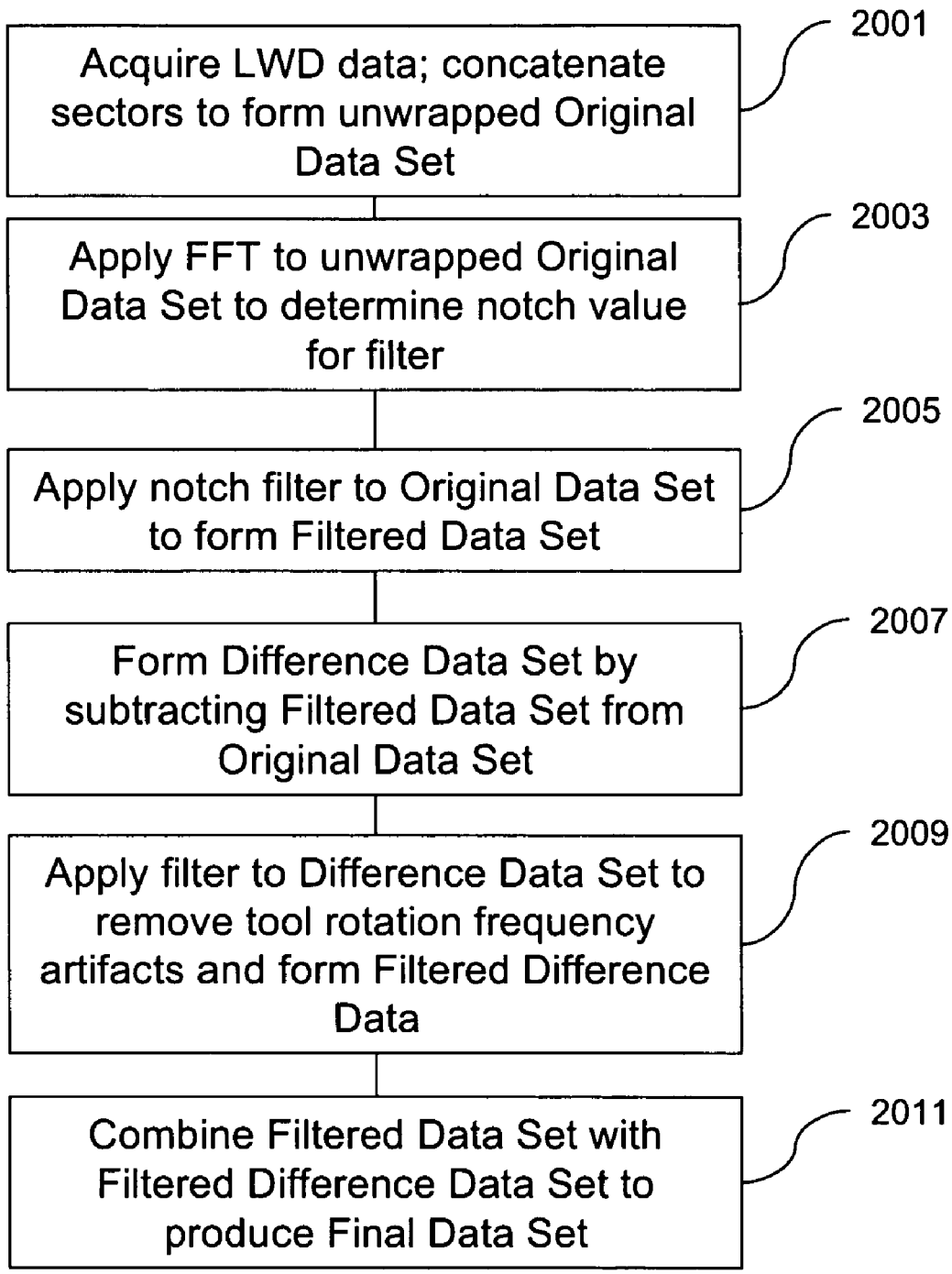
FIG. 20 is a flow chart of an embodiment of the present invention.

FIG. 20 illustrates a flow chart of a method of removing tool rotational effects provided by the present invention. Data are acquired 2001 and sectors are concatenated to form an unwrapped Original Data Set. The frequency spectrum of the Original Data Set is calculated by applying an FFT to the unwrapped Original Data Set to determine the parameters for a notch filter 2003 to be applied to the data. A notch filter is applied 2005 to form a Filtered Data Set. A Difference Data Set is formed 2007 by subtracting the Filtered Data Set from the Original Data Set. The frequency spectrum of the Difference Data Set is analyzed to determine what frequencies to filter. A filter is then applied 2009 to the Difference Data Set to remove tool rotation frequency artifacts and form a Filtered Difference Data Set. The Filtered Difference Data Set is combined 2011 with the Filtered Data Set to produce a Final Data Set, the data without the spiral effect due to the acquisition.

Figure 21:
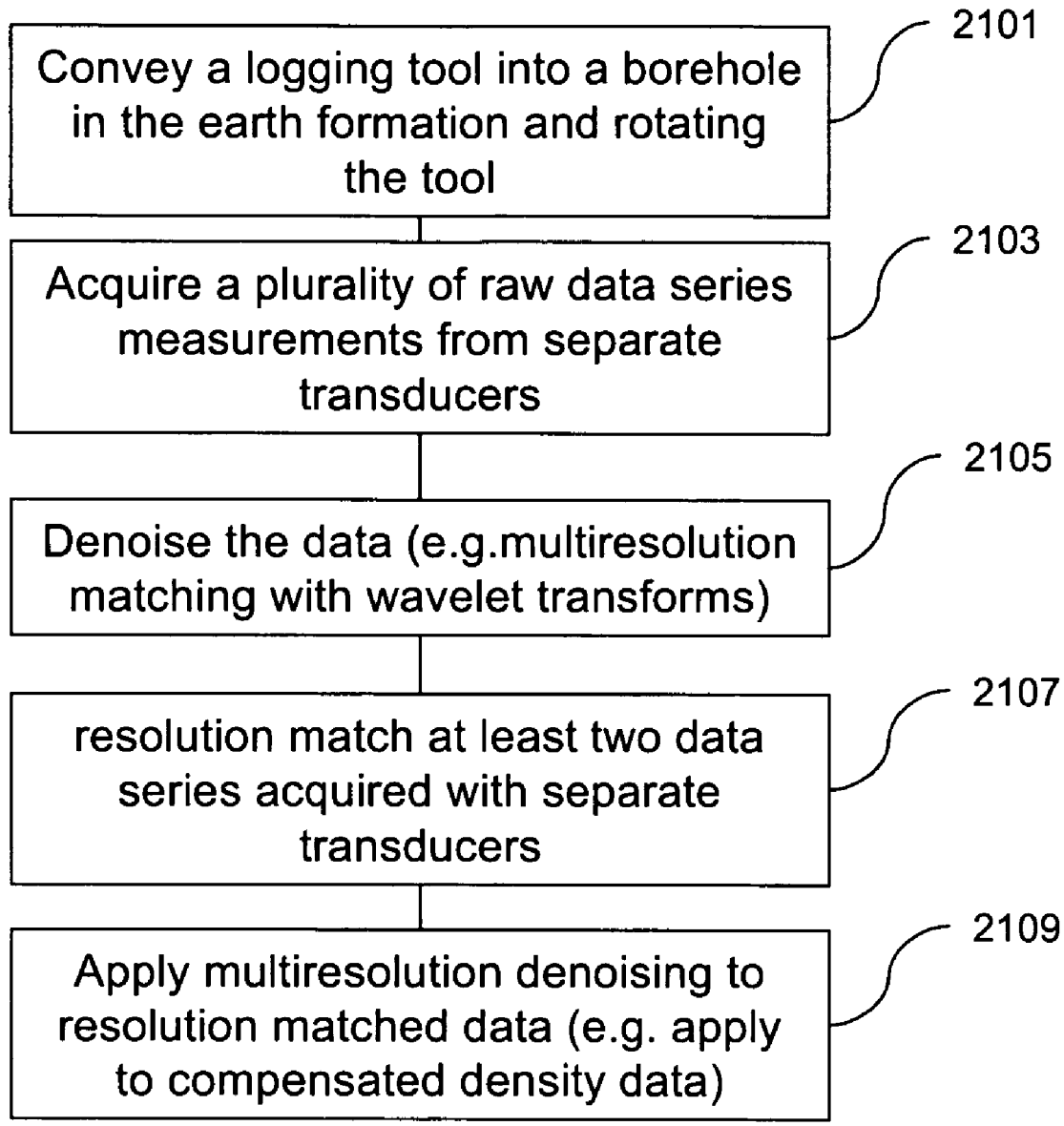
FIG. 21 is a flow chart of an embodiment of the present invention.

FIG. 21 illustrates a flow chart of a method provided by the present invention to denoise the acquired data and to resolution match data from separate transducers (e.g. sensors $R_1$ to $R_n$ as illustrated in FIG. 3A). Data are acquired during logging 2101. The raw data series are each acquired from separate transducers 2103, for example SS and LS density (or count rate) data. Each data series is then denoised 2105 using a multi-resolution wavelet transform up to an arbitrary number of levels as disclosed above in reference to FIG. 4A, and then one or more of the levels may be filtered. After denoising the data series are resolution matched 2107 as disclosed above in reference to FIG. 8, FIG. 9 and FIG. 10 to produce a resolution matched data set. The resolution matched data (e.g. compensated density data) set is a final output, but optionally the resolution matched data may be denoised again 2109 using the multi-resolution wavelet transform of FIG. 4A. Optionally the data may have been depth matched and the spiral effects due to borehole acquisition dynamics also removed (see discussion related to FIG. 20).

Figure 22:
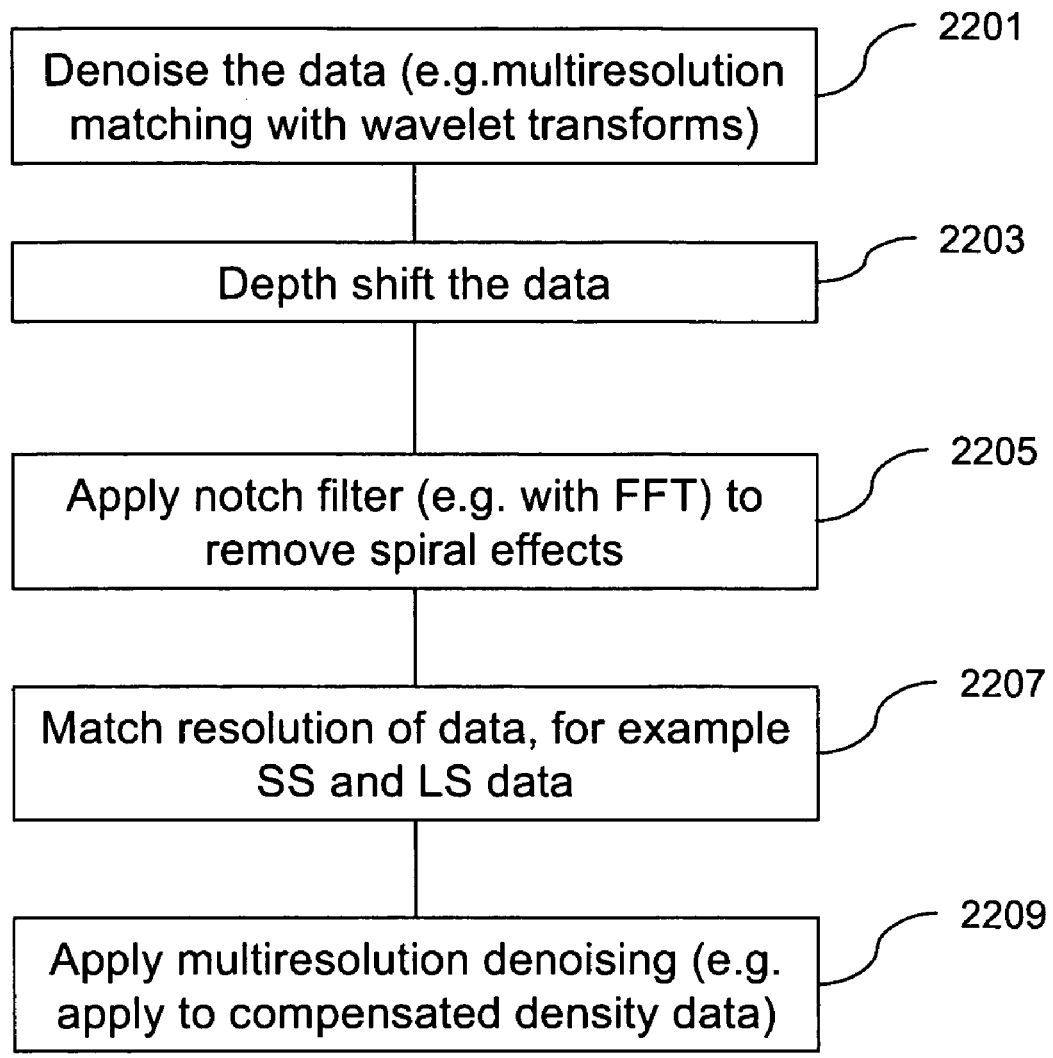
FIG. 22 is a flow chart of an embodiment of the present invention.

FIG. 22 illustrates a further embodiment of the present invention. The acquired data are denoised 2201 using the multi-resolution wavelet transform method disclosed in reference to FIG. 4. Optionally the data are depth corrected as necessary 2203. A notch filter may be applied to remove the spiral acquisition effects caused by logging acquisition dynamics 2205. The resolution of different data series may be matched to combine the data 2207, for example combining the SS and LS density data, which may be implemented in conjunction with creating compensated density data. If further denoising is required, the multi-resolution wavelet transform method of FIG. 4 may be applied to the data 2209 (e.g. compensated data).

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of logging an earth formation while drilling comprising:
    (a) conveying a logging tool into a borehole in the earth formation and rotating the tool therein;
    (b) acquiring a plurality of measurements of a parameter of interest of the earth formation during rotation of the tool to obtain a plurality of raw data series wherein each raw data series is acquired with a separate transducer;
    (c) denoising at least one of the plurality of raw data series using a multi-resolution wavelet transform to obtain a denoised data series;
    (d) matching the resolution of the denoised data series with at least one of the plurality of raw data series to obtain a resolution matched data series;
    (e) obtaining an image of the borehole with the resolution matched data series and;
    (f) recording the image on a suitable medium.

2. The method of claim 1 further comprising determining a depth shift for at least one of i) the raw data series, ii) the denoised data series and iii) the resolution matched data series.

3. The method of claim 1 further comprising:
    (a) determining a notch filter to apply to a first data series in the plurality of data series wherein the first data series is selected from the group consisting of i) the raw data series, ii) the denoised data series and iii) the resolution matched data series, to obtain a Notch Filtered Data Set;
    (b) subtracting the Notch Filtered Data Set from the first data series to obtain a Difference Data Set;

(c) filtering the Difference Data Set to obtain a Filtered Difference Data; and (d) combining the Filtered Data Set with the Filtered Difference Data Set to obtain a Final Data Set.

4. The method of claim 1 further comprising determining a borehole shape by determining tool position corrections from eccentering measurements.

5. The method of claim 4 further comprising determining whether the raw data series are acquired in at least one position selected from a group consisting of: i) cuttings data, and ii) breakout data by comparing the raw data series position with the borehole shape.

6. The method of claim 4 further comprising determining a position of a borehole breakout by comparing the raw data series with the borehole shape.

7. The method of claim 1 wherein the parameter of interest comprises at least one selected from a group consisting of: i) density, ii) porosity, iii) electrical resistivity, iv) a nuclear magnetic resonance property, and v) acoustic reflectance.

8. A wellbore apparatus conveyed in a borehole in an earth formation for determining a characteristic of the formation, the apparatus comprising:

(a) a logging tool rotatable in the earth formation;

(b) a plurality of sensors configured to acquire raw data series associated with each sensor indicative of a parameter of interest; and (c) a processor configured to denoise at least one of the raw data series with a multi-resolution wavelet transform to obtain a denoised data series; match resolution of the denoised data series with at least one of the plurality of raw data series to obtain a resolution matched data series; and obtain an image of the borehole with the resolution matched data series.

9. The wellbore apparatus of claim 8 wherein a sensor in the plurality of sensors is an acoustic standoff sensor.

10. The wellbore apparatus of claim 8 wherein the plurality of sensors are selected from a group consisting of: i) a density sensor, ii) a porosity sensor, iii) an electrical resistivity sensor, iv) a nuclear magnetic resonance property sensor, and v) an acoustic reflectance sensor.

11. The wellbore apparatus of claim 8 further comprising a telemetry that is configured to communicate data indicative of the image to a surface recording unit.

12. A system for determining a property of an earth formation using a logging tool in a borehole, the system comprising:

(a) at least one transmitter in the logging tool configured to generate signals into the formation;

(b) a plurality of sensors configured to receive raw data series responsive to the generated signals at a plurality of borehole depths, wherein each of the raw data series received is associated with one of the plurality of sensors;

(c) a processor configured to denoise at least one of the raw data series with a multi-resolution wavelet transform to obtain a denoised data series;

(d) a processor configured to match resolution of the denoised data with at least one of the plurality of raw data series to obtain a resolution matched data series; and (e) a processor configured to obtain an image of the borehole with the resolution matched data series.

13. The system of claim 12 further comprising a processor configured to determine a depth shift for at least one of i) the raw data series, ii) the denoised data series and iii) the resolution matched data series.

14. The system of claim 12 further comprising a processor configured to:

(a) determine a notch filter to apply to a first data series wherein the first data series is at least one selected from the group consisting of i) said raw data series, ii) said denoised data series and iii) said resolution matched data series, to obtain a Notch Filtered Data Set;

(b) subtract the Notch Filtered Data Set from the first data series to obtain a Difference Data Set;

(c) filter the Difference Data Set to obtain a Filtered Difference Data; and (d) combine the Filtered Data Set with the Filtered Difference Data Set to obtain a Final Data Set.

15. The system of claim 12 further comprising a processor configured to determine a borehole shape by determining tool position corrections from eccentering measurements.

16. The system of claim 15 further comprising a processor configured to determine whether raw data series are acquired in at least one borehole position selected from the group consisting of: i) cuttings data, and ii) breakout data by comparing the raw data series position with the borehole shape.

17. The system of claim 15 further comprising a processor configured to determine the position of a borehole breakout by comparing the raw data series position with the borehole shape.

18. The system of claim 12 wherein the raw data series is one selected from the group consisting of: i) density, ii) porosity, iii) electrical resistivity, iv) a nuclear magnetic resonance property, and v) acoustic reflectance.

19. The system of claim 12 wherein the sensor is at least one selected from the group consisting of: i) a density sensor, ii) a porosity sensor, iii) an electrical resistivity sensor, iv) a nuclear magnetic resonance property sensor, and v) an acoustic reflectance sensor.

20. The system of claim 12 further comprising a telemetry that is configured to communicate data indicative of the image to a surface recording unit.

* * * * *